US009258629B2

(12) United States Patent
Graves et al.

(10) Patent No.: US 9,258,629 B2
(45) Date of Patent: Feb. 9, 2016

(54) SYSTEM AND METHOD FOR AN AGILE CLOUD RADIO ACCESS NETWORK

(71) Applicant: Huawei Technologies Co., Ltd., Shenzhen (CN)

(72) Inventors: Alan Frank Graves, Kanata (CA); Dominic Goodwill, Ottawa (CA); Eric Bernier, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 3 days.

(21) Appl. No.: 13/922,683

(22) Filed: Jun. 20, 2013

(65) Prior Publication Data

US 2014/0161447 A1    Jun. 12, 2014

Related U.S. Application Data

(60) Provisional application No. 61/735,842, filed on Dec. 11, 2012.

(51) Int. Cl.
| | | |
|---|---|---|
| *H04B 10/00* | (2013.01) | |
| *H04Q 11/00* | (2006.01) | |
| *H04W 76/04* | (2009.01) | |
| *H04L 12/721* | (2013.01) | |

(52) U.S. Cl.
CPC ....... *H04Q 11/0005* (2013.01); *H04Q 11/0062* (2013.01); *H04W 76/04* (2013.01); *H04L 45/62* (2013.01); *H04Q 2011/0056* (2013.01); *H04Q 2011/0081* (2013.01); *H04Q 2011/0086* (2013.01)

(58) Field of Classification Search
USPC .................................................. 398/115–117
See application file for complete search history.

(56) References Cited

U.S. PATENT DOCUMENTS

| | | | | |
|---|---|---|---|---|
| 6,058,317 | A * | 5/2000 | Posti ............................. | 455/561 |
| 6,314,163 | B1 * | 11/2001 | Acampora .................... | 379/56.2 |
| 7,937,110 | B2 * | 5/2011 | Wu et al. ....................... | 455/561 |
| 7,953,404 | B2 * | 5/2011 | De Benedittis et al. ...... | 455/423 |
| 8,406,178 | B2 * | 3/2013 | Tan et al. ...................... | 370/328 |
| 8,913,892 | B2 * | 12/2014 | Berlin et al. .................. | 398/115 |
| 2010/0087227 | A1 * | 4/2010 | Francos et al. ............. | 455/562.1 |
| 2010/0216467 | A1 * | 8/2010 | Ryan et al. .................. | 455/435.1 |
| 2010/0239256 | A1 * | 9/2010 | Zheng ............................. | 398/66 |

(Continued)

FOREIGN PATENT DOCUMENTS

| | | |
|---|---|---|
| CN | 101505500 A | 8/2009 |
| CN | 101998441 A | 3/2011 |

(Continued)

OTHER PUBLICATIONS

Graves, Alan F., "Future Metro Photonic Network Solutions-Input to Metro Charter, Impact on Test Bed," A discussion paper; Issue 2, 7968248Canada, Inc., Nov. 12, 2012, 83 pp.

(Continued)

*Primary Examiner* — Agustin Bello
(74) *Attorney, Agent, or Firm* — Slater & Matsil, L.L.P.

(57) ABSTRACT

In one embodiment, a cloud radio access network (C-RAN) includes a first plurality of antennas and a first plurality of radio remote units (RRUs) coupled to the plurality of antennas. The C-RAN also includes a first plurality of broadband base units (BBUs) and a first photonic switch optically coupled between the first plurality of RRUs and the first plurality of BBUs.

30 Claims, 22 Drawing Sheets

(56) References Cited

U.S. PATENT DOCUMENTS

| | | | |
|---|---|---|---|
| 2011/0201268 A1* | 8/2011 | He et al. | 455/7 |
| 2011/0236024 A1* | 9/2011 | Mao | 398/115 |
| 2012/0064908 A1* | 3/2012 | Fox et al. | 455/452.2 |
| 2013/0243075 A1* | 9/2013 | Dalela et al. | 375/240.01 |
| 2013/0279452 A1* | 10/2013 | Liu | 370/329 |
| 2014/0018090 A1* | 1/2014 | Khoryaev et al. | 455/452.1 |
| 2014/0031049 A1* | 1/2014 | Sundaresan et al. | 455/447 |
| 2014/0161447 A1* | 6/2014 | Graves et al. | 398/48 |
| 2014/0226736 A1* | 8/2014 | Niu et al. | 375/260 |
| 2014/0241315 A1* | 8/2014 | Niu et al. | 370/331 |
| 2014/0255034 A1* | 9/2014 | Huo | 398/82 |
| 2014/0349667 A1* | 11/2014 | Hahn et al. | 455/452.1 |
| 2015/0003275 A1* | 1/2015 | Krishnamurthy | 370/252 |

FOREIGN PATENT DOCUMENTS

| | | |
|---|---|---|
| EP | 2753141 A1 | 7/2014 |
| WO | 2012097627 A1 | 7/2012 |
| WO | 2013029385 A1 | 3/2013 |
| WO | 2013048510 A1 | 4/2013 |

OTHER PUBLICATIONS

PCT International Search Report and Written Opinion, PCT/CN2014/079680, Applicant: Huawei Technologies Co., Ltd., dated Sep. 23, 2014, 13 pages.

"C-RAN; The Road Towards Green RAN," White Paper, China Mobile Research Institute, Version 2.5, Oct. 2011, 48 pgs.

Bingfu, W., "Pervasive ICT—From Antenna to Cloud @ CT," Huawei Technologies Co., Ltd., WWRF #27, Oct. 18, 2011, 21 pgs.

* cited by examiner

SYSTEM AND METHOD FOR AN AGILE CLOUD RADIO ACCESS NETWORK

This application claims the benefit of U.S. Provisional Application Ser. No. 61/735,842 filed on Dec. 11, 2012, and entitled "System and Method for Multi-Wavelength Signaling in a Photonic Packet Switch," which application is incorporated herein by reference.

TECHNICAL FIELD

The present invention relates to a system and method for communications, and, in particular, to a system and method for a cloud radio access network with agile traffic handling.

BACKGROUND

Demand for cellular services is increasing rapidly as new broadband mobile services come on-line and are rapidly adopted. This leads to a preference for increased bandwidth capacity within cells and increased density of cells. The density of base station increases, both by reducing cell size and increasing the transmission bandwidth per cell, which is achieved by higher bandwidth throughput per carrier and using multiple carriers in each cell site.

This increase in base station density leads to a preference for small, simple, and low power wireless base stations at the antenna sites. Base station functions may be centralized to simplify the antenna site functions. In an example, the entire base station, except for a radio frequency (RF) transmitter and receiver, are centralized, with the in-phase (I) and quadrature (Q) components of the digital RF modem output being transmitted digitally over a low delay, low jitter digital optical path to the antenna site. At the antenna site, digital-to-analog (D/A) converters convert the digital streams into the I and Q components of the signal, modulated on to the outgoing RF carriers generated on site. These components are then fed via a power amplifier (PA) to the antenna for transmission. In the reverse direction, the output from the RF receiver at the antenna site may be oversampled, digitized using an analog-to-digital converter (A/D), and transmitted digitally back to a central location for digital I and Q extraction. The optical transmission link has a high bandwidth and a low consistent delay to avoid affecting the radio timing and modem performance, because excess delay, jitter, or errors from the transmission path are effectively injected into the modem process. Otherwise severe impairments in modem characteristics and RF characteristics may be seen.

A radio network, like other access networks, is subject to changing traffic patterns and traffic loads, as well as occasional equipment failures. Adding switching may accommodate the ability to reconfigure connections and capacities to antenna sites. However, the addition of switching may add undesirable latency (delay) and jitter to the connections from the central location to the antenna sites. Delay can have the effect of modifying the timing for round trip responses from user equipments, thereby reducing the maximum cell size, while jitter inserted into the middle of a modem can create major impairments in that modem.

SUMMARY

An embodiment cloud radio access network (C-RAN) includes a first plurality of antennas and a first plurality of radio remote units (RRUs) coupled to the plurality of antennas. The C-RAN also includes a first plurality of broadband base units (BBUs) and a first photonic switch optically coupled between the first plurality of RRUs and the first plurality of BBUs.

An embodiment method for adjusting links in a cloud radio access network (C-RAN) includes unlinking, by a photonic switch, a first radio remote unit (RRU) of a plurality of RRUs from a first baseband unit (BBU) of a plurality of BBUs, where the photonic switch is optically coupled between the first RRU and the first BBU and linking, by the photonic switch, a second RRU of the plurality of RRUs to the first BBU, where the photonic switch is optically coupled between the first BBU and the second RRU.

Another embodiment method for adjusting links in a cloud radio access network (C-RAN) includes deciding to adjust an old mapping between a plurality of BBUs and a plurality of RRUs to a new mapping, where a photonic switch is optically coupled between the plurality of RRUs and the plurality of BBUs and determining a new mapping between the plurality of BBUs and the plurality of RRUs. The method also includes adjusting a plurality of links between the plurality of BBUs and the plurality of RRUs in accordance with the new mapping.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
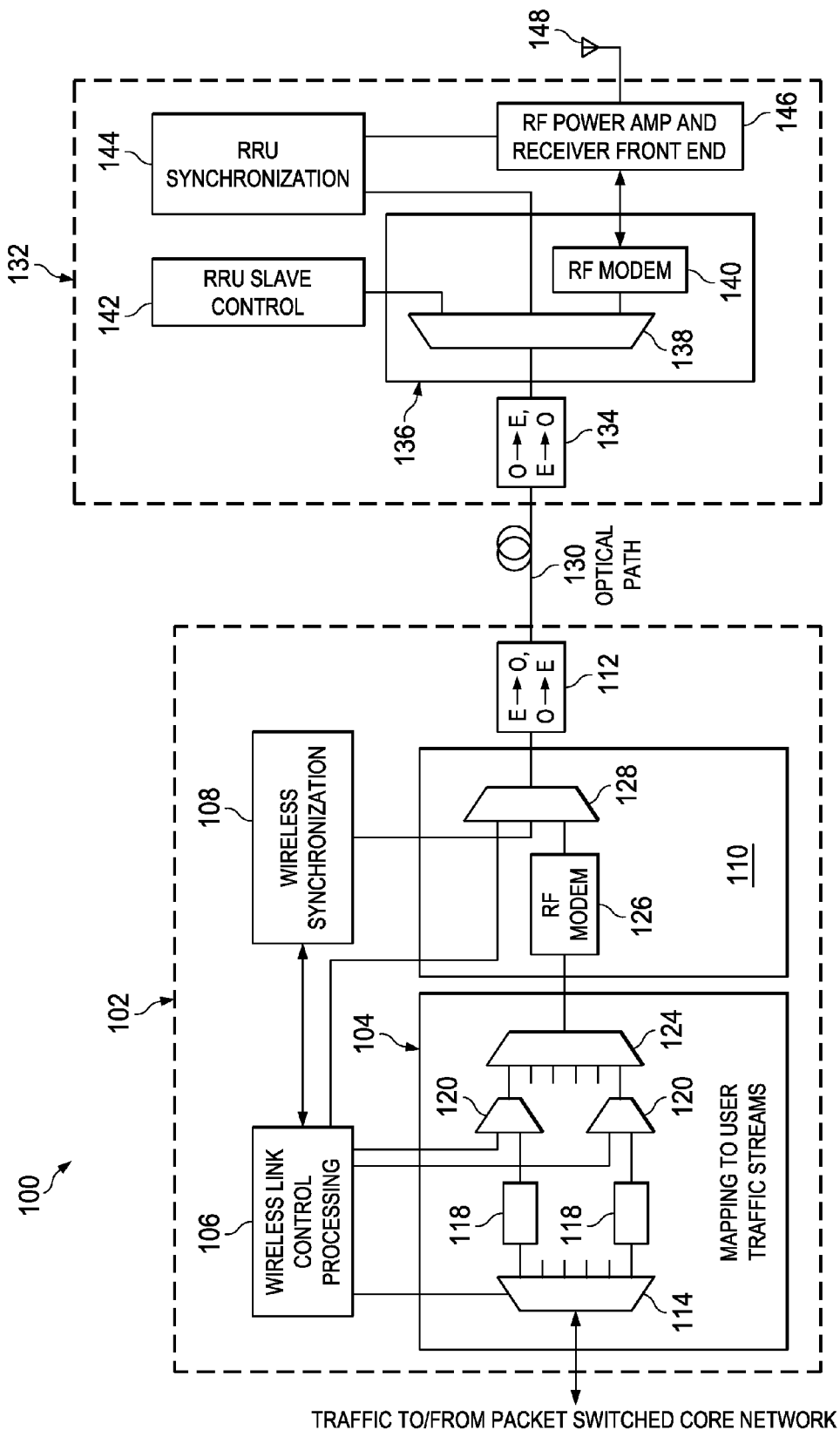
FIG. 1 illustrates an embodiment system for cloud radio access network (C-RAN)

A cloud computing radio access network (C-RAN) is a type of cellular network. A C-RAN involves a large array of virtual or actual broadband base units (BBUs) that interact with the rest of the cloud data center to provide broadband and communications services to cellular subscribers by converting the multi-service data streams routed to each cell site into a digital representation of the radio frequency (RF) modulation for services. FIG. 1 illustrates C-RAN 100. In the C-RAN approach, the BBUs' function includes the digital generation of the RF modem signals in-phase (I) and quadrature (Q) as high bandwidth bit streams fed to the transmitter site for conversion to analog and then transmission.

In a radio access network (RAN), cellular wireless system, functionality is co-located with the antenna site. However, in a C-RAN, the per-user and per-service functions, the radio control functions, and the coding functions are centralized. The field-located functions may be limited to analog RF functions and the digital-to-analog (D/A) and analog-to-digital (A/D) functions to link the digitally formatted modem I and Q data to the analog RF functions. Also, the residual synchronization, control, and slave operations administration and management (OAM) functions for field equipment are in the antenna. The field mounted equipment is simplified, facilitating smaller, lighter, and lower cost field units. However, the umbilical transmission link from BBU to radio remote unit (RRU) handles the digitized modem I, Q components, which have orders of magnitude more bandwidth than the baseband data. One component pair may occupy 10 to 100 Gb/s, and hence an entire wavelength slot in a wavelength division multiplexing (WDM) system. It is desirable to keep the component pairs together, for example by byte interleaving them on the same optical carrier, to avoid a differential delay form creating a different delay for the I and Q components.

In C-RAN 100, BBU 102 is optically coupled to RRU 132 by optical path 130, for example an optical fiber. In a RAN wireless system, the functions illustrated in FIG. 1 are collocated at the antenna site. For example, the functions contained in BBU 102 would be housed in the RRU. Locating the functionality at the antenna site minimizes the required link capacity to the antenna site, but places the bulk of the functionality of the cellular wireless system on the antenna site. These functions add significant size, power, cost, and complexity to the antenna sites. They also introduce long communications paths for complex functions. These issues become more problematic as antenna sites are packed more densely, and as the choice of locations becomes more constrained.

Because the BBUs are remote from the antenna sites, they can be collocated with each other as a centralized resource pool in a convenient location. When collocated, the BBU functions may be implemented en masse in common hardware or virtualized into software functions in high performance processors.

In C-RAN 100, data to be delivered to end users' systems enter BBU 102 from a data center or data network in the form of transmission control protocol internet protocol (TCP/IP) packet streams addressed to the users' IP addresses. The data streams are buffered in mapping block 104 to be forwarded to the users when the flow control across the wireless system has the capacity. As packets are forwarded, they pass through demultiplexer 114 and queues 118. The streams are multiplexed with streams from wireless link control processing block 106 by multiplexers 120. Then, the streams are multiplexed by multiplexer 124. The composite data stream, which is the data stream to be transmitted, is forwarded to digital coding block 110.

Many wireless systems use complex modulation schemes, such as 64 QAM (64 levels (8×8) quadrature amplitude multiplexing), which uses both amplitude and phase modulation to create an efficient coding scheme. The I and Q components are generated in a digital form, for example in RF modem 126. The digital data output is in the form of digital I and Q modem signal components, and is multiplexed by multiplexer 128 with data from wireless link control processing block 106 and wireless synchronization block 108. The digital information is then converted from the electrical domain to the optical domain by electrical-to-optical/optical-to-electrical converter 112. The optical data stream is optically transmitted over optical link 130 to RRU 132.

The data is then received by RRU 132, where the optical data stream is converted from the optical domain to the electrical domain by optical-to-electrical/electrical-to-optical converter 134. The electrical data stream enters digital decoding block 136. The data is demultiplexed by demultiplexer 138 to strip off the RRU control and synchronization, and the RRU control and synchronization information is sent to RRU slave control block 142 and RRU synchronization block 144. The remaining digital I and Q information is sent to residual RF modem function 140, which contains only the residual digital to analog functions necessary to create the actual RF signal modulation for the I and Q planes. The information is passed to RF power amplifier and receiver front end 146 where it is fed to balanced modulators, which modulate two identical frequency intermediate frequency radio carriers that are 90 degrees phase shifted from each other. Then these are combined and up-converted to the final radio frequency, and fed to antenna 148 via an RF power amplifier stage.

In the reverse direction, RRU 132 receives the incoming cellular traffic from user devices, which is encoded in an upstream coding constellation, for example a QAM format. RRU 132 may recover the I and Q components from the receiver intermediate frequency signal. The I and Q components are fed into a high speed A/D converter, before the digital data is multiplexed with the RRU control channel, and converted into an optical signal. Alternatively the receiver intermediate frequency signal is oversampled and transmitted digitally to the BBU for I and Q extraction. In either example, the BBU performs the decoding functions on the modulation constellation.

The optical signal is transmitted on optical link 130 to BBU 102. The received data is converted to an output of TCP/IP traffic, for example in a standard Ethernet format, and transmitted to a data center or data network. This may be done by a process of decoding the modem constellation, extracting the data, and passing the extracted data to the packet switched network.

The optical link between BBUs and RRUs transmits a high bit rate data stream carrying time sensitive and phase sensitive data. The data is especially sensitive to jitter. Jitter is the random, pseudo-random, or random-like short period modulation of a signal's delay, producing phase noise. The delay-sensitive aspects stem from the optical transport being in the middle of the overall modem coding function, after the wireless flow control. The wireless flow control is at the BBU, so delay on the optical link reduces the available delay on the round trip air interface, impacting the maximum cell size and/or the cell traffic packing efficiency. Phase sensitivity, especially the jitter sensitivity, arises from the fact that uncompensated phase error on the I and Q composite signals translates as crosstalk, leading to the erosion of the system margin, because the differentiation between the I and Q component signals is in the phase.

Figure 2:
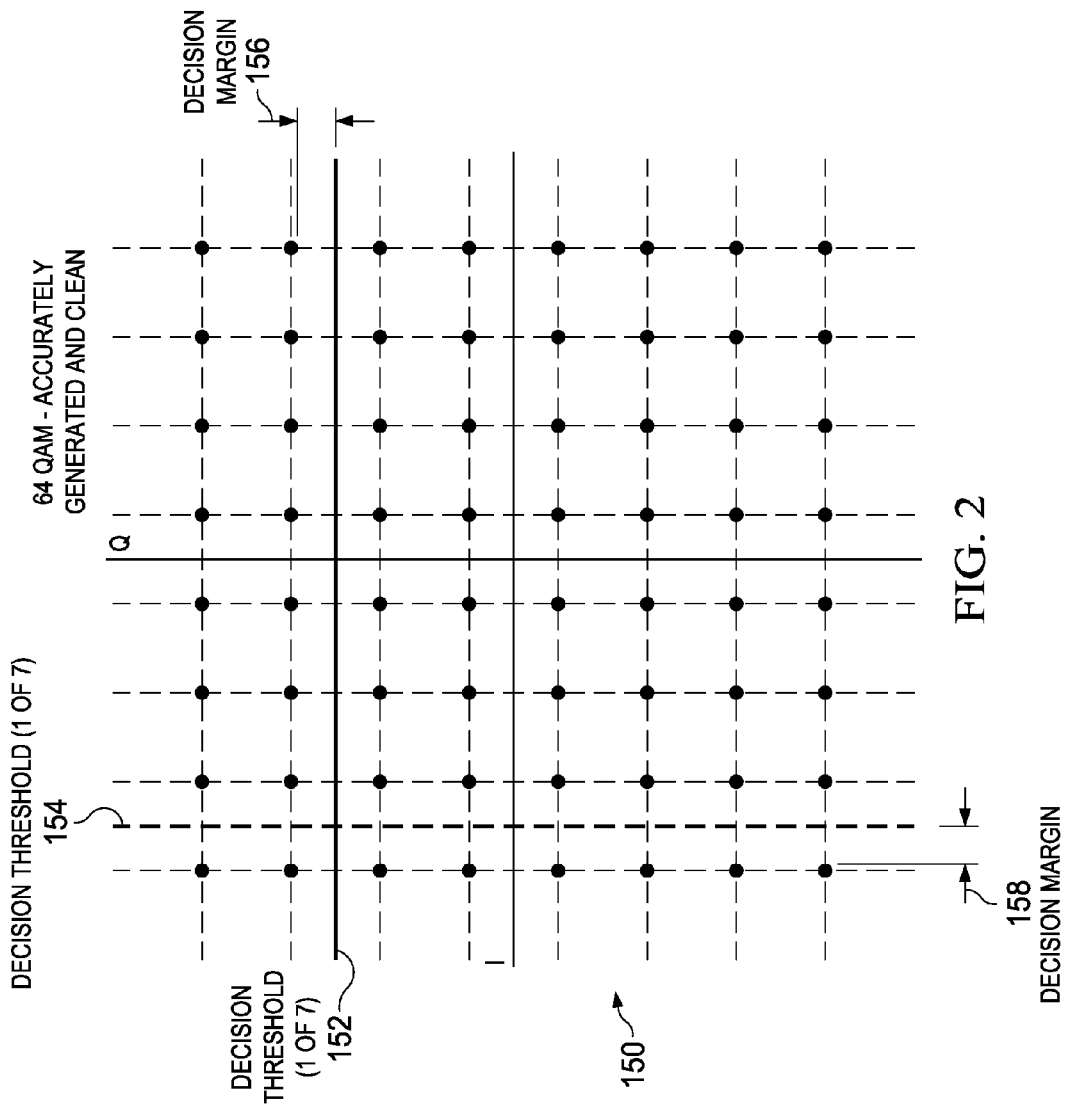
FIG. 2 illustrates jitter and phase noise for accurately generated 64 QAM before air transmission.
Figure 3:
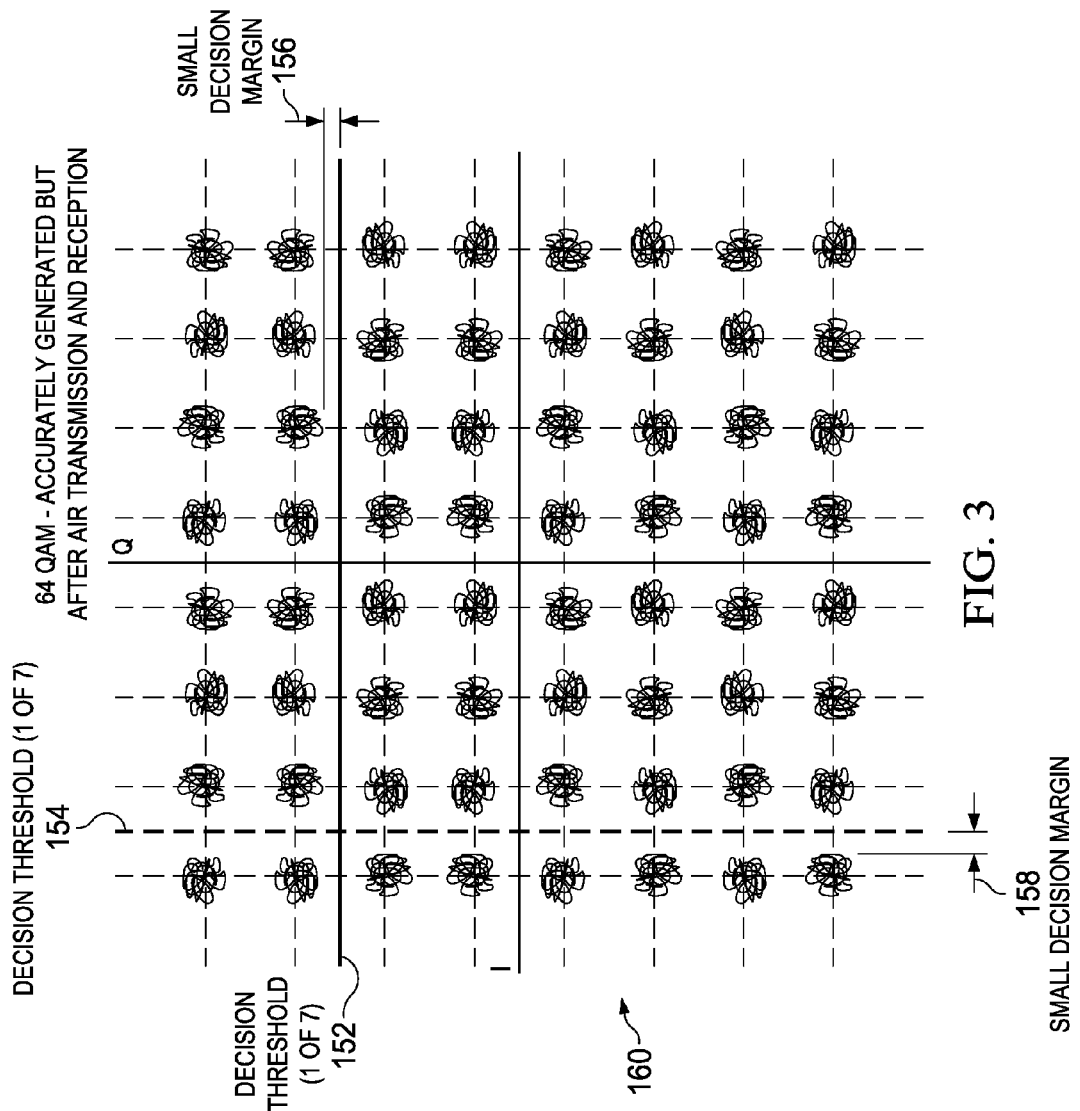
FIG. 3 illustrates jitter and phase noise for the same accurately generated 64 QAM after air transmission and reception.
Figure 4:
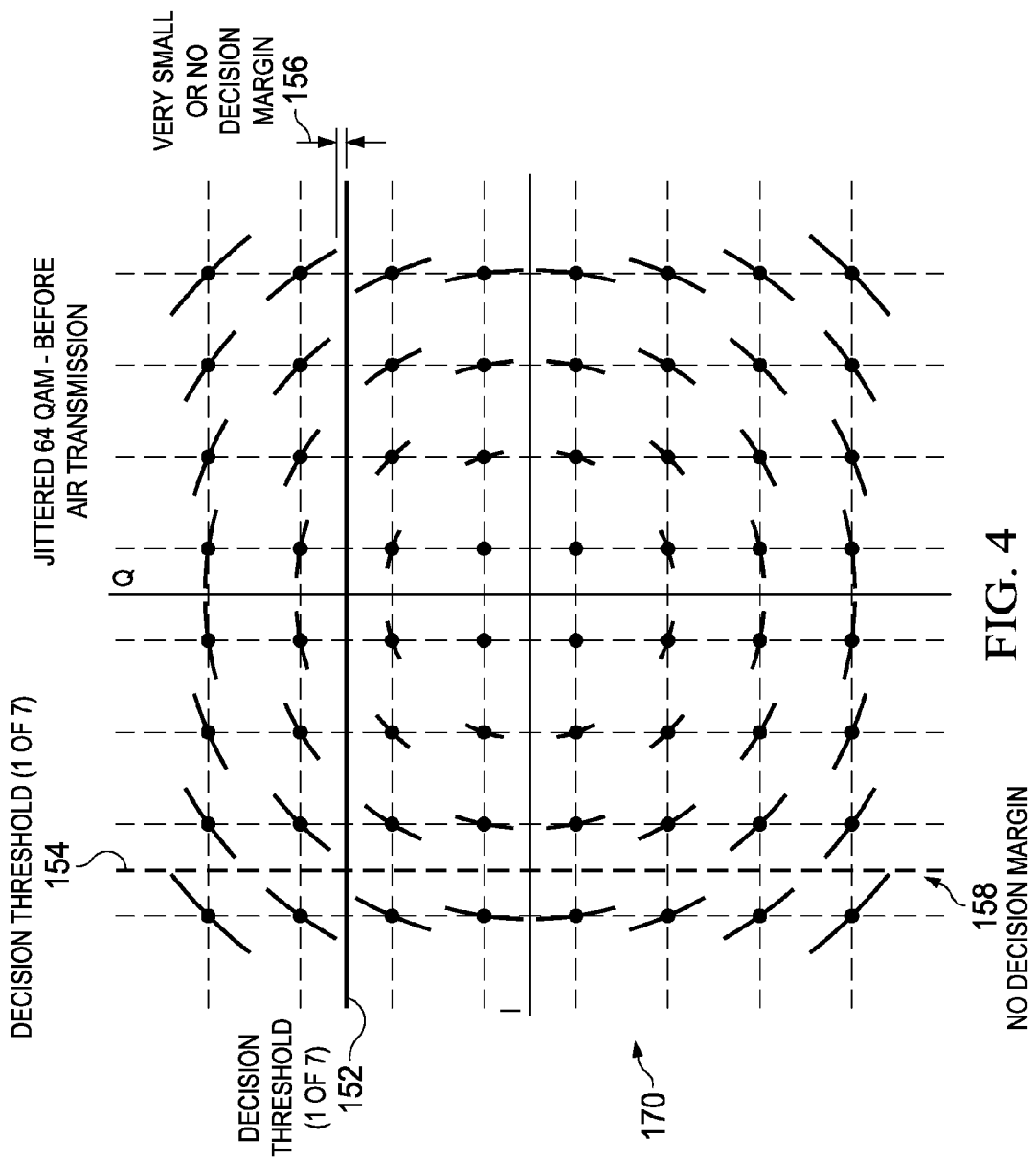
FIG. 4 illustrates jitter and phase noise for jittered 64 QAM before air transmission.
Figure 5:
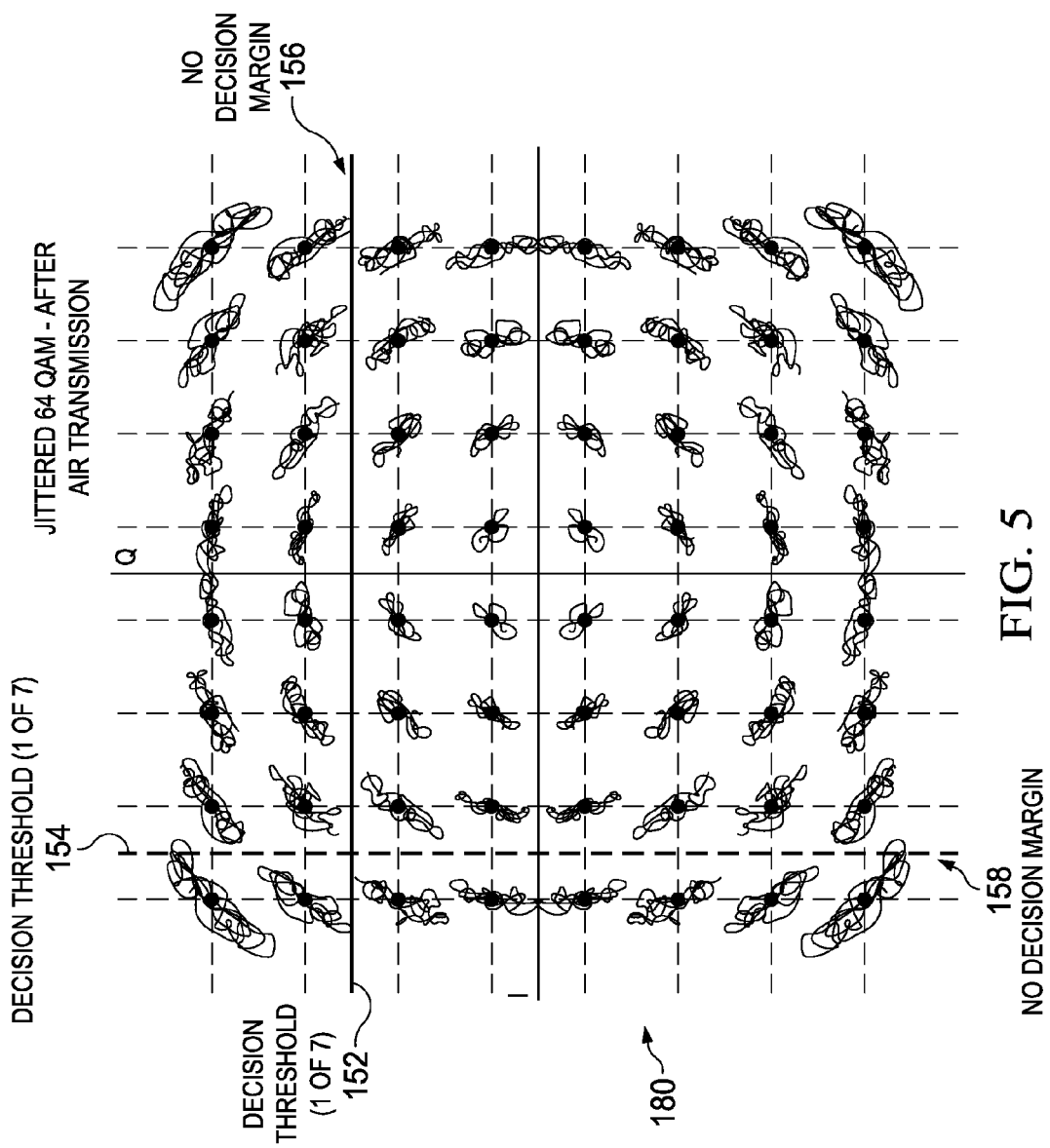
FIG. 5 illustrates jitter and phase noise for the same jittered 64 QAM after air transmission.

FIG. 2 illustrates constellation 150, an accurately generated 64 QAM constellation before air transmission. FIG. 3 illustrates constellation 160, which is an accurately generated 64 QAM constellation as received after air transmission. The link losses and receiver processes have added noise to the recovered constellation, reducing the decision threshold margins. FIG. 4 illustrates constellation 170, a 64 QAM constellation that has been subject to extra jitter by the umbilical optical transmission system between the BBU and RRU, as it would appear before air transmission, and FIG. 5 illustrates constellation 180, of the same jittered 64 QAM constellation after air transmission and reception, including the effects of the air link loss and interference and the receiver noise. These 64 QAM constellations have decision thresholds 152 and 154 with corresponding decision margins 156 and 158, respectively. The phase noise has degraded the receiver's ability to recover the data. The effects are less for 16 QAM, while being even more substantial for 256 QAM than for 64 QAM, because of the closer spacing of the constellation levels.

Static delay, causing a static phase shift, can be compensated for in terms of recovering the data, because the reference point of the constellation is delayed by the same amount as the digitized I and Q components. However, with jitter, the phase noise is not the same for both, because it is time variant. Hence, it is desirable to minimize the jitter in optical links between the BBUs and RRUs. It is also desirable to minimize transmission delay through the BBU-RRU links, since this subtracts from the permissible round-trip air-time delay, potentially reducing the maximum radius of the wireless cell, since the BBU sees the concatenated air-time and optical delays.

The links between the BBUs and the RRUs carry the digitized I and Q components, plus an overhead channel. These I and Q components are of a higher digital bandwidth than the baseband TCP/IP data.

Figure 6:
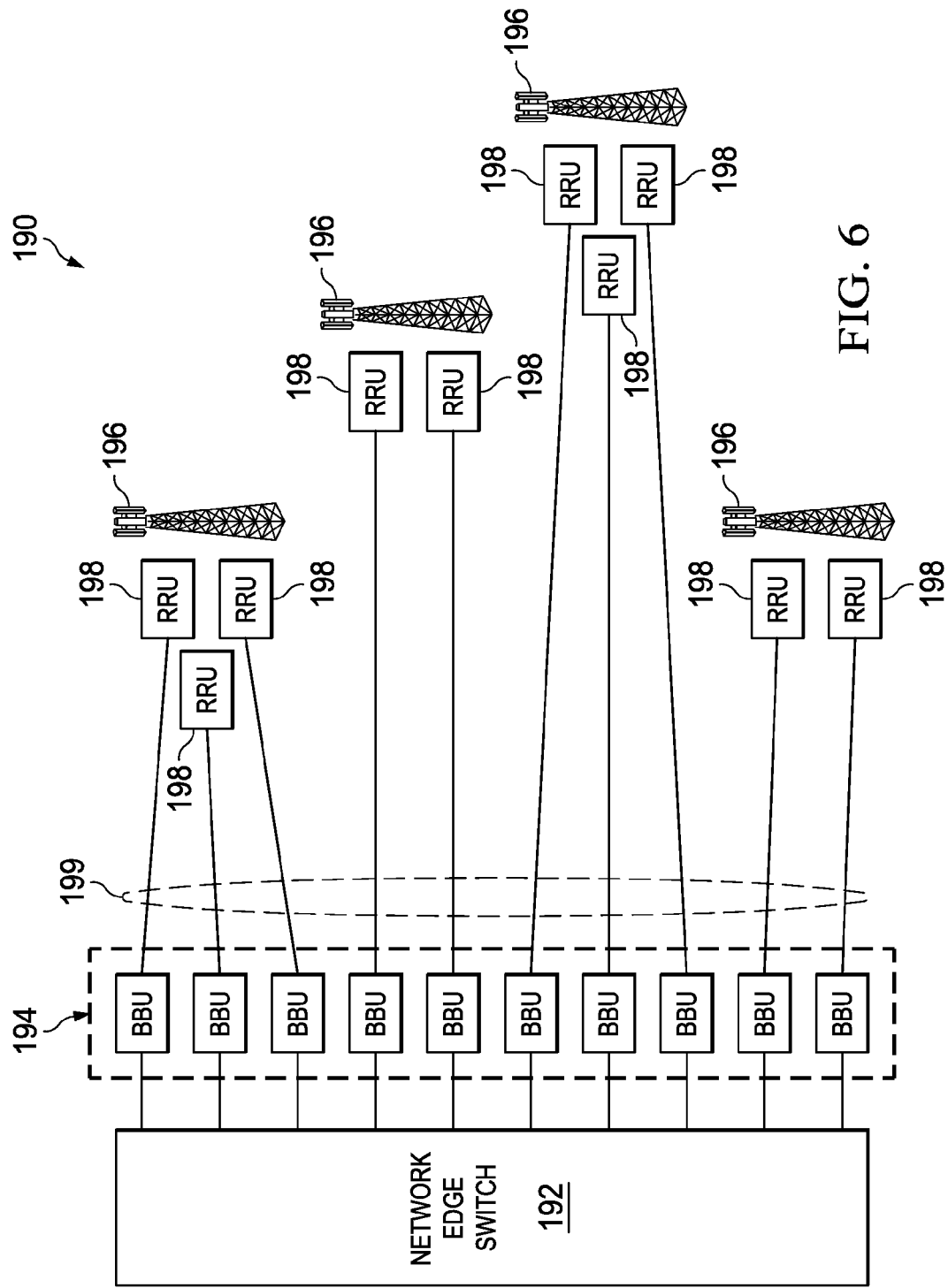
FIG. 6 illustrates an embodiment system for C-RAN.

FIG. 6 illustrates C-RAN 190. BBUs 194 are directly coupled to RRUs 198, which are coupled to antennas 196 at antenna sites. A one-to-one mapping of BBUs to RRUs is pictured. However, the separate BBUs pictured indicate a functional BBU, not a physically separate BBU. One BBU generally has the functionality to support one RRU. However, while the BBUs may be separate devices, they may be combined into one physical device, for instance as multiple virtual devices. In one example, BBUs are in one single unit. In another example, each BBU is a separate unit. Alternatively, several BBUs make up a physical unit. BBUs 194 are coupled to network data switch 192.

Low delay low jitter optical links 199 connect BBUs 194 to RRUs 198. There is a fixed association between BBUs and RRUs. The RRUs are clustered around antenna sites. The antenna sites have one or more antenna 196 and sufficient RRUs 198 to meet the peak traffic demand of the antenna site. Because of the fixed association between RRUs and BBUs in C-RAN 190, there are enough BBUs to handle all of the antenna sites' peak traffic simultaneously. However, it is unlikely that all antenna sites will experience peak traffic at the same time.

The base stations operate in conjunction with other base stations in a cooperative manner. In C-RAN 100, optical links 199 are dedicated fibers or dedicated optical wavelengths on fibers with a direct optical path to minimize delay. These hard wired point-to-point links associate one RRU with one BBU. This may lead to over-provisioning and a lack of network flexibility.

Overprovisioning stems from a desire to prevent the RRUs from becoming a bottleneck. The RRUs in an antenna site handle the peak traffic of that antenna site location. Because RRUs are statically mounted with antennas, the RRUs have the capacity to provide peak traffic in all cell site locations simultaneously. Because of the one-to-one links of the BBUs to the RRUs, the BBUs are also over-provisioned. During off-peak traffic periods at a given site, not all RRUs at that site need be active. However, the BBUs, having a fixed association with RRUs, cannot be redeployed.

However, peak traffic generally does not happen everywhere simultaneously. For example, business areas and residential areas have different peak traffic times. In business areas, the peak traffic occurs in the weekday mornings and afternoons, usually with a decrease during lunchtime, and much less traffic in the evenings and weekends. In residential areas, the traffic pattern may peak in the late afternoon and evening, with a high traffic level on the weekends. Areas with extensive entertainment or nightlife activity may have a late night spike in activity. Additionally, various events may occur that trigger abnormal traffic loads or hotspots, such as sporting events, entertainment events, accidents, disasters, and demonstrations.

Flexibility in a C-RAN network is desirable. In a flexible network, some RRUs may be disconnected during low traffic intervals without a loss of service coverage for users in those neighboring areas. Other RRUs at the same antenna site can still be providing coverage. Also, an entire antenna site, including an antenna and associated BBUs, may be shut down, while RRUs at adjacent antenna sites expand their coverage areas to cover the coverage area previously covered by the shut down antenna site. Table 1 illustrates some situations where flexibility of a C-RAN network is beneficial.

TABLE 1

| Application Backhaul/Interconnect to Wireless Basestations | Capacities | Granularity (prioritized) | Set Up Time | Hold Time | Notes |
|---|---|---|---|---|---|
| Transport | All traffic to wireless basestations | λ, λ-group, fiber | 100's ms-several 10's seconds | minutes-years | Centralized Network management sets up connections in response to external requests form Wirelss Network management system - these may be manual or from a network analysis tool |
| Protection | All traffic to affected basestations | λ, λ-group, fiber | 10's of ms-seconds | minutes-months | Failures cannot be anticipated in time but planning for recovery can be done ahead of time. Switching time must be fast enough to avoid service loss at higher layers (time-outs) if continuity of service through outage is required |
| Time of Day routing | Significant portion of traffic to wireless basestations | λ, λ-group, fiber | Seconds | hours | Migrating capacity may be significant portion of entire wireless capacity but the need for the move is known in advance and is scheduled. |
| Hot spot response | Multiplication of traffic to affected basestations | | Seconds | minutes-hours | Hot spot traffic needs may be several times the normal capacity for a given area. Hot spots are usually unexpected growth of aggregated traffic from multiple users and grows over periods of many seconds to 10's of minutes depending upon the cause. |

Figure 7:
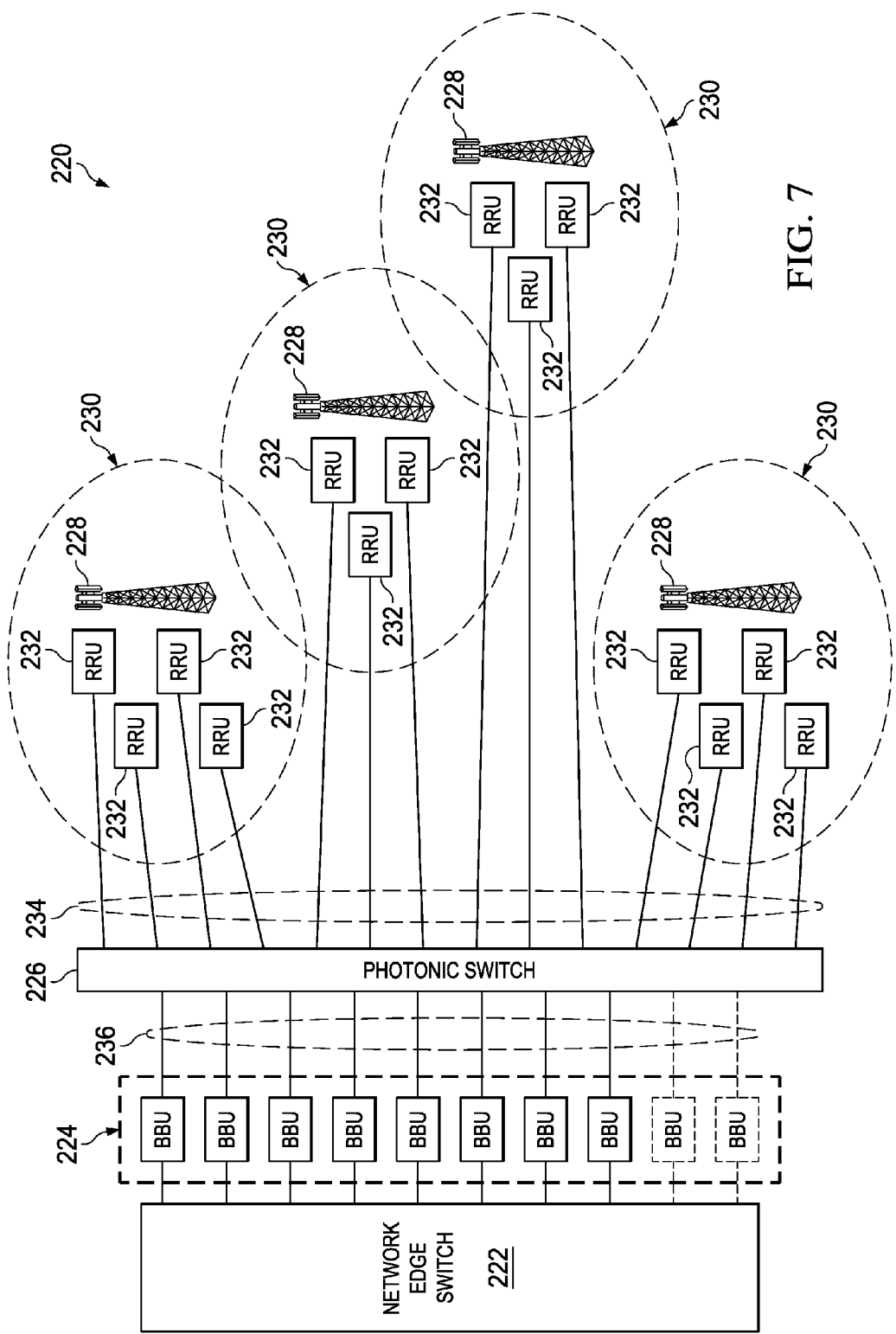
FIG. 7 illustrates an embodiment system for C-RAN.

FIG. 7 illustrates C-RAN 220. Like C-RAN 190, network edge data switch 222 is coupled to BBUs 224. RRUs 232 are associated with antennas 228 in antenna sites. The antenna sites have coverage areas 230. However, coupled between BBUs 224 and RRUs 232 is photonic switch 226. Photonic switch 226 is fully connected, so it can connect any BBU to any RRU in a non-blocking manner, without disturbing other optical streams. Photonic switch 226 has a low delay caused by the finite speed of light propagating through the optical path through that photonic switch. Optical links 236 optically couple BBUs 224 and photonic switch 226, while optical links 234 optically couple photonic switch 226 and RRUs 232.

The mapping of BBUs 224 to RRUs 232 is flexible, because of photonic switch 226. Because the traffic at antenna sites varies with time, when the traffic in a particular antenna site is light, some of the RRUs, and their associated BBUs, may be taken out of service. The switched off RRUs cannot be redeployed at other locations because they are located at an antenna site. However, the switched off BBUs can be connected to RRUs at other antenna sites by adjusting photonic switch 226. Hence, there do not need to be sufficient BBUs to service all antenna sites at peak traffic simultaneously. An adequate BBU level provides sufficient coverage for the total peak traffic at any particular time.

For example, a particular business site requires ten RRUs during business hours and five RRU during evenings and weekends. On the other hand, a particular residential site requires twelve RRUs during evenings and weekends and three RRUs during business hours. A C-RAN network supporting this traffic capacity requires 12+10=22 RRUs. In a traditional C-RAN network, 22 BBUs are also needed. However, a C-RAN network with a photonic switch, during business hours 10+3=13 BBUs are needed, and during evenings and weekends, needs 5+12=17 BBUs. In this situation, 17 BBUs may be used, reducing the number of BBUs by five.

C-RAN 220 illustrates a reduction in the number of BBUs. In this example, it may be assumed that some antenna sites are in residential areas with peak traffic in the evenings and weekends, and some antenna sites are in business areas with heavy daytime traffic and low traffic in the evenings and weekends. BBUs feeding RRUs in the business area may be reconnected to RRUs in the residential area in the evenings and weekends, and revert to the business site weekdays mornings. BBUs may thus provision RRUs more economically, enabling both service areas to meet their traffic peaks.

Figure 8:
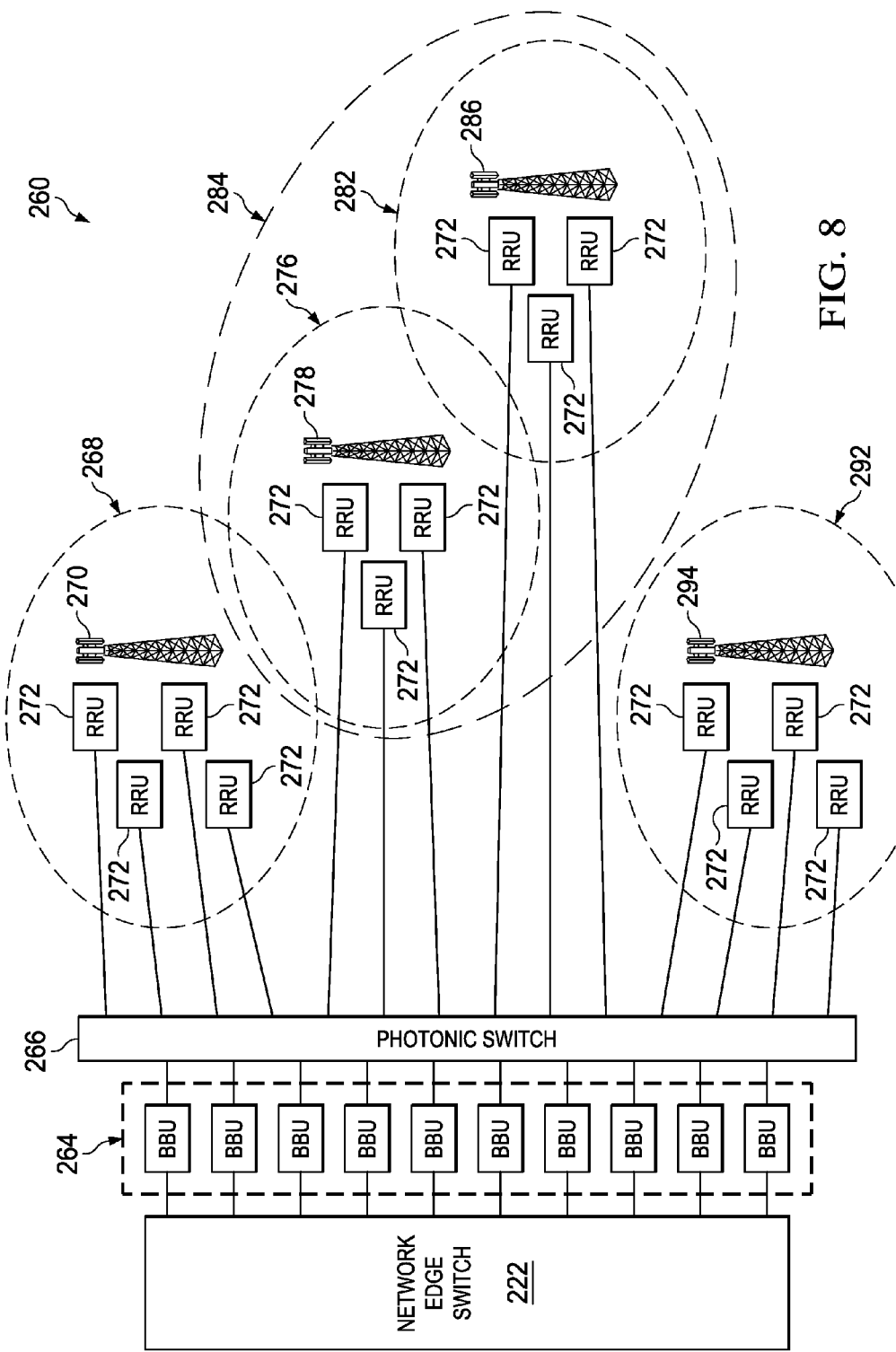
FIG. 8 illustrates another embodiment system for C-RAN.

FIG. 8 illustrates C-RAN 260. C-RAN 260 contains network edge switch 262 coupled to BBUs 264. Photonic switch 266 is optically coupled between BBUs 264 and RRUs 272, which are associated with antennas 270, 278, 286, and 294 forming antenna sites. Initially, antenna 270 has a coverage area 268, antenna 278 has a coverage area 276, antenna 286 has a coverage area 282, and antenna 294 has a coverage area 292.

During light traffic times, an entire antenna site may be shut down, with coverage provided by neighboring antenna sites. For example, antenna 278 and its associated RRUs are shut down. To compensate, antenna 286 increases its coverage area, so there is no gap in coverage. In one example, the additional coverage is provided by beam-forming with an adaptive antenna. Alternatively, the modem characteristics are changed to a hardier but less efficient code. For example, it may migrate from 256 QAM to 16 QAM. This reduces throughput, which may not be a problem at a low traffic time, such as the middle of the night. Powering down an antenna site leads to saving in energy costs.

Figure 9:
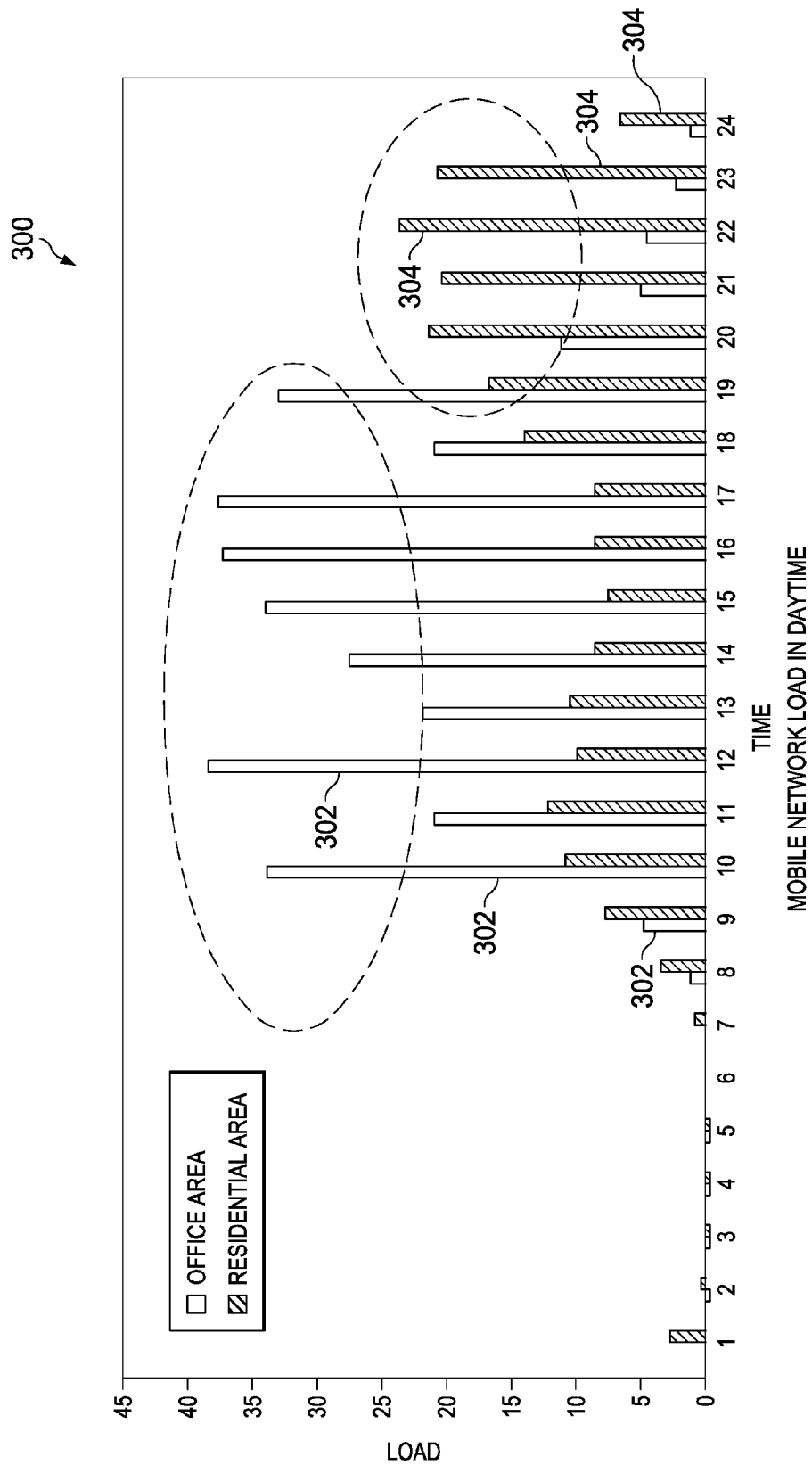
FIG. 9 illustrates a graph of mobile network load by time of day.

FIG. 9 illustrates graph 300 which shows an example of the load in an office area and a residential area by time throughout a day. Bars 302 illustrate traffic in the office area and bars 304 illustrate traffic in the residential area. In this example, 24% of the network capacity can be re-deployed, with a 21% savings in BBU capacity compared to a fixed C-RAN. This saving in BBU-count is derived as follows. Office areas have a peak need of 39, while residential areas have a peak need of 24 units. Using a fixed C-RAN, the total capacity required is 39+24=63 units. However, the peak capacity for office and residential need is about 50 units, for a savings of 13 units. This is a saving of 13/63=21%. 15 units, or about 24% of the network capacity, need to be redeployed. The unused BBUs may be powered down when not needed, leading to a power saving.

The migration of capacity is relatively slow or somewhat slow. Even traffic changes resulting from an unplanned event, such as a sudden disaster situation take tens of seconds or minutes to build up to a peak, not milliseconds or microseconds. Also, a reconfiguration requires other network changes.

Therefore, the photonic switch in a C-RAN may be a "slow" photonic switch that can switch in milliseconds or tens of milliseconds, rather than nanoseconds. The photonic switch should have an excellent optical connection once a connection is made with as little jitter or optical delay as possible. For a transparent photonic switch with low polarization mode dispersion (PMD), such as a MEMS switch, there are no jitter-producing processes. A low loss photonic switch, such as a micro-electro-mechanical (MEMS) switch, may be used. MEMS switches have excellent optical properties for their connected optical paths and excellent isolation between switched optical paths, with a switching time of tens of milliseconds. Alternatively, other photonic switches, such as silicon photonic integrated circuits, may be used.

A photonic switch in a C-RAN may operate at the fiber-to-fiber level, for example when a BBU-RRU link is not on a WDM grid. Alternatively, the photonic switch may operate at the individual wavelength level when WDM is used. In one example, the photonic switch is a photonic integrated circuit. The photonic integrated circuit may comprise silicon waveguides, indium phosphide waveguides, silica waveguides, or another photonic switching technology. In another example, MEMS photonic switches are used. A small optical switch may be used to create a fiber-to-fiber switch. Alternatively, a large optical switch handling multiple wavelength planes in one fabric may be used for a wavelength plane switch for dense WDM (DWDM) applications.

Multi-stage switches, such as CLOS switches, use multiple switching elements in series stages and in parallel, with a complex junctoring pattern of interconnected between the stages to create a larger blocking, conditionally non-blocking, or fully non-blocking fabric. A non-blocking multi-stage fabric uses a degree of dilation in the center stage, for example from n to 2n−1, where n is the number of ports on the input of each input stage switch module.

Figure 10:
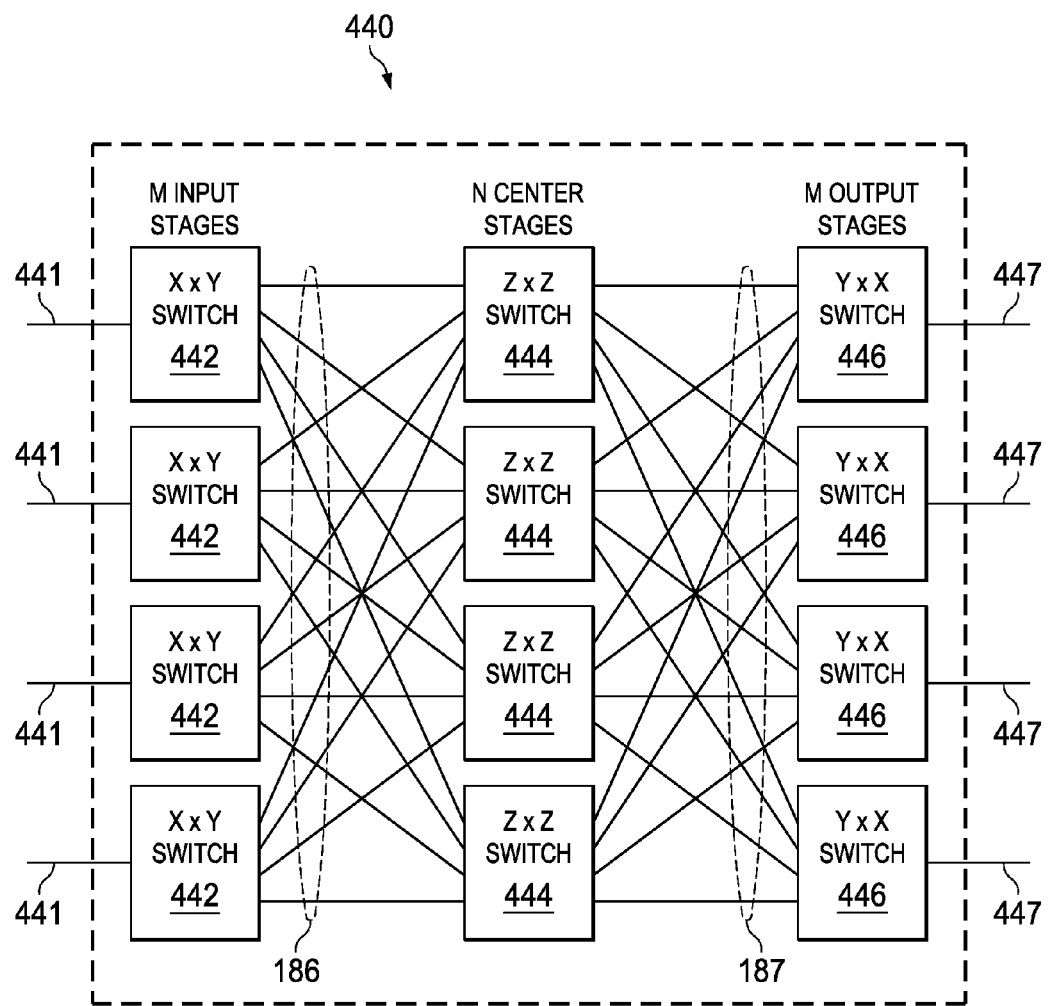
FIG. 10 illustrates a photonic switching structure.

FIG. 10 illustrates CLOS switch 440, a three stage CLOS switch fabricated from 16×16 photonic switches. CLOS switch 440 contains inputs 441, which are fed to input stage fabrics 442, X by Y switches. Junctoring pattern of connections 186 connects input stage fabrics 442 and center stage fabrics 444, Z by Z switches. X, Y, and Z are positive integers. Also, junctoring pattern of connections 187 connects center stage fabrics 444 and output stage fabrics 446, Y by X switches to connect every fabric in each stage equally to every fabric in the next stage of the switch. Output stage fabrics 446 produce outputs 447. Four input stage fabrics 442, center stage fabrics 444, and output stage fabrics 446 are pictured, but fewer or more stages or fabrics per stage may be used. In an example, there are the same number of input stage fabrics 442 and output stage fabrics 446, with a different number of center stage fabrics 444, where Z is equal to Y times the number of input stages divided by the number of center stages. The effective port count of CLOS switch 440 is equal to the number of input stage fabrics multiplied by X by the number of output stage fabrics multiplied by X. In an example, Y is equal to 2X−1, and CLOS switch 440 is non-blocking. In another example, X is equal to Y, and CLOS switch 440 is conditionally non-blocking. Existing circuits may have to be arranged to clear some new paths. A non-blocking switch is a switch that connects N inputs to N outputs in any combination irrespective of the traffic configuration on other inputs or outputs. A similar structure can be created with 5 stages for larger fabrics, with two input stages in series and two output stages in series.

Figure 11:
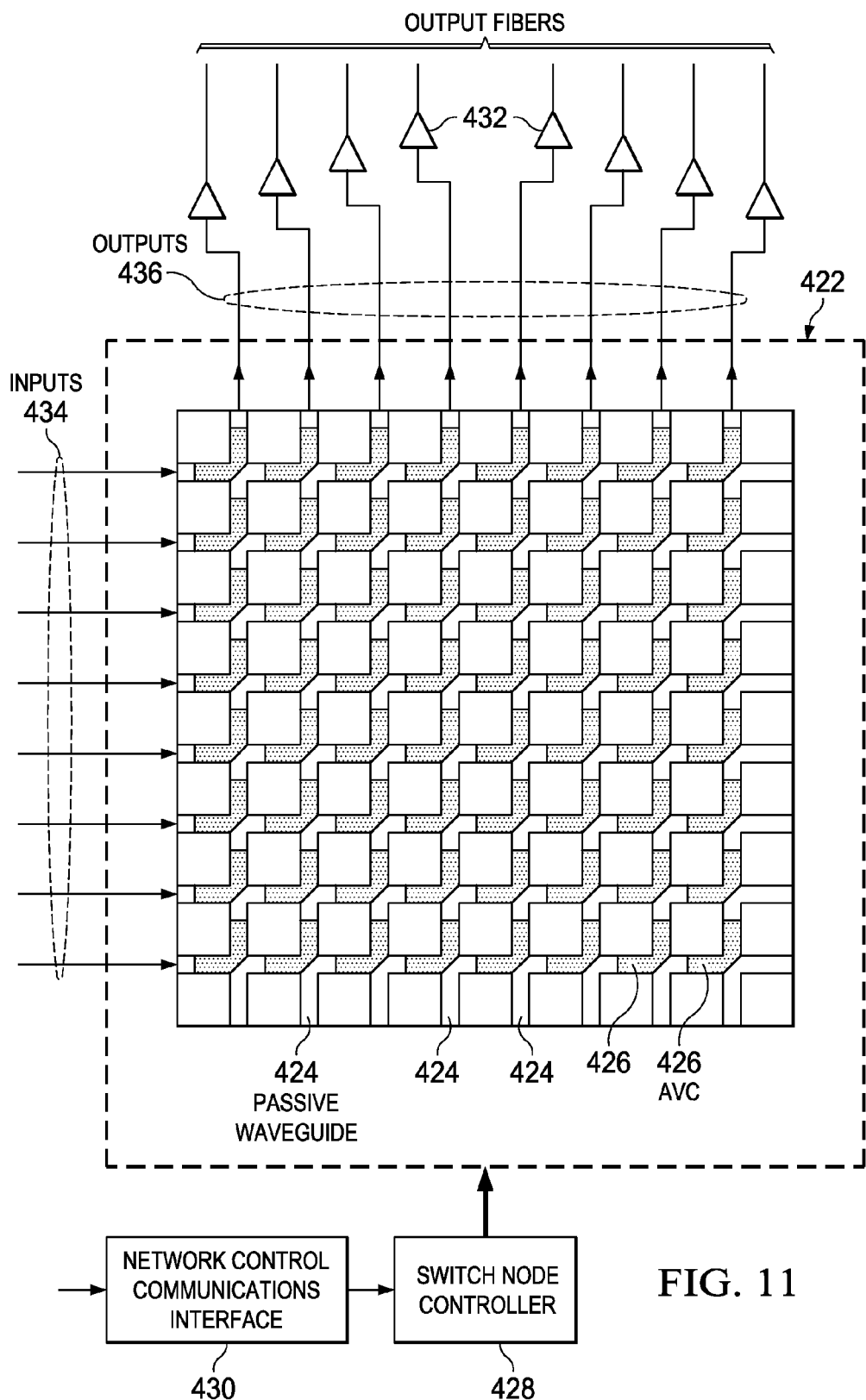
FIG. 11 illustrates a photonic switching chip.

FIG. 11 illustrates solid state photonic switch 422. Solid state photonic switch 422 may be used for fabrics in input stage fabrics 442, center stage fabrics 444, and output stage fabrics 446. In an example, solid state photonic switch 422 is a non-blocking indium phosphide or silicon solid state monolithic or hybridized switch crosspoint array. Solid state photonic switch 422 contains inputs 434 and outputs 436. Eight inputs 434 and eight outputs 436 are pictured, but more or fewer inputs and outputs may be used. Also, solid state photonic switch 422 contains active vertical couplers (AVCs) 426 and passive waveguides 424. AVCs 426 are created by combining a semiconductor optical amplifier (SOA) with vertical coupling at the cross points where the input lines and the output lines cross each other. When an electrical current is driven into the SOA, it becomes transparent, and exhibits gain, so the signal on the input line, coupled into the SOA by the vertical coupler, is amplified, and emitted into the output line when coupled through a second vertical coupler. When no current is driven into the SOA, it remains opaque with no optical gain, and the light remains in the input waveguide, propagating to the next cross point.

Optical amplifiers 432 are at outputs 436. Optical amplifiers 432 reduce optical loss components of optical impairments of solid state photonic switch 422.

Solid state photonic switch 422 is controlled by switch node controller 428, which operates under the network management control. Also, switch node controller 428 is controlled by network control communications interface 430, which receives control messaging and cross connection requires from the network manager.

Figure 12:
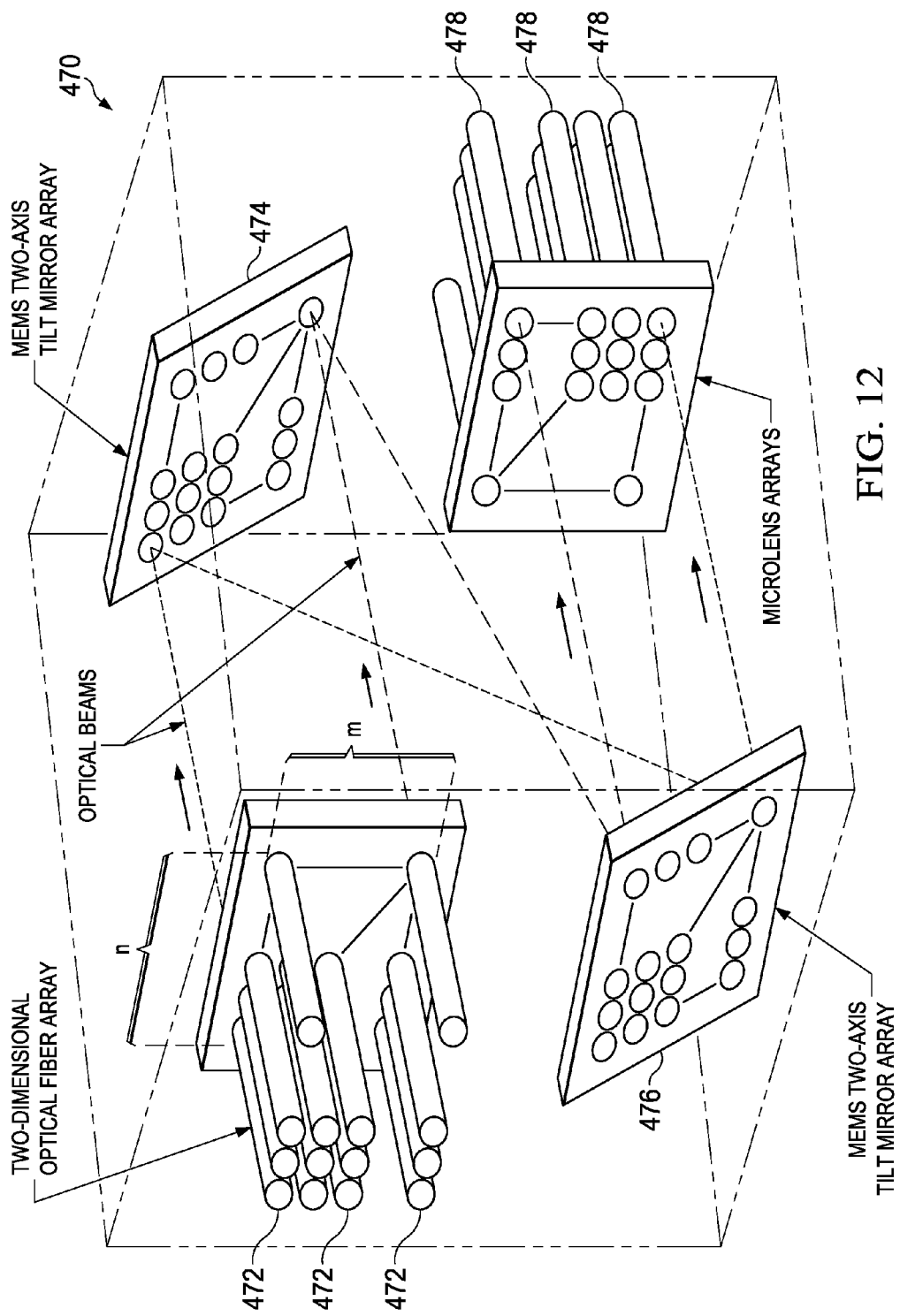
FIG. 12 illustrates a micro-electro-mechanical system (MEMS) photonic switch.

In an example, a MEMS switch may be used for photonic switching is a C-RAN. FIG. 12 illustrates MEMS photonic switch 470. MEMS photonic switch 470 is larger, more expensive, and switches more slowly than solid state photonic switch 422. The switching speed of MEMS photonic switch 470 may be from significantly below 10 ms to almost 100 ms. While this slow switching speed is too slow for many applications, a photonic switch in a C-RAN does not need to have a fast switching speed. Also, MEMS photonic switch 470 has excellent optical performance, including a low loss, virtually no crosstalk or nonlinearity, and the ability to handle multi-carrier optical signals. In one example, MEMS photonic switch 470 is used alone. In another example, a MEMS photonic switch 470 is used in CLOS switch 440 or another three stage fabric. This may enable non-blocking switches of 50,000 by 50,000 or more fibers. Optical amplifiers may be used with MEMS photonic switch 470 to compensate for the optical loss of the MEMS switch, as well as to partially compensate for the optical loss of the fiber run.

MEMS photonic switch 470 contains steerable mirror planes 474 and 476. Light enters via beam collimator 472, for example from optical fibers, and impinges on steerable mirror plane 474. Steerable mirror plane 474 is adjusted in angle in two planes to cause the light to impinge on the appropriate mirrors of steerable mirror plane 476. The mirrors of steerable mirror plane 476 are associated with a particular output port. These mirrors are also adjusted in angle in two planes to cause coupling to the appropriate output port. The light then exits in a beam decollimator 478, for example coupling to optical fibers.

In one example, MEMS switches are arranged as multi-stage switches, such as CLOS switch 440. A three stage non-blocking MEMS-based CLOS switch may utilize 320 by 320 MEMS switching modules, and provide a capacity of around 50,000 wavelengths in a dilated non-blocking structure, or 100,000 in an undilated conditionally blocking structure. Table 2 below illustrates the scaling of the maximum switch fabric sizes for various sizes of constituent models with MEMS photonic switches with a 1:2 dilation for a non-blocking switch. Very high port capacities and throughputs are available.

TABLE 2

| MEMS Module Capacity | Input Stage Module Size | Center Stage Module Size | Output Stage Module Size | Overall Fabric Port Capacity | Throughput at 40 Gb/s per Port (Tb/s) | Throughput at 100 Gb/s per Port (Tb/s) |
|---|---|---|---|---|---|---|
| 96 × 96 | 48 × 96 | 96 × 96 | 96 × 48 | 4,608 × 4,608 | 184 | 461 |
| 100 × 100 | 50 × 100 | 100 × 100 | 100 × 50 | 5,000 × 5,000 | 200 | 500 |
| 192 × 192 | 96 × 192 | 192 × 192 | 192 × 96 | 18,432 × 18,432 | 737 | 1,843.2 |
| 200 × 200 | 100 × 200 | 200 × 200 | 200 × 100 | 20,000 × 20,000 | 800 | 2,000 |
| 300 × 300 | 150 × 300 | 300 × 300 | 300 × 150 | 45,000 × 45,000 | 1,800 | 4,500 |
| 320 × 320 | 160 × 320 | 320 × 320 | 320 × 160 | 51,200 × 51,200 | 2,048 | 5,120 |
| 400 × 400 | 200 × 400 | 400 × 400 | 400 × 200 | 80,000 × 80,000 | 3,200 | 8,000 |
| 500 × 500 | 250 × 500 | 500 × 500 | 500 × 250 | 125,000 × 125,000 | 5,000 | 12,500 |
| 600 × 600 | 300 × 600 | 600 × 600 | 600 × 300 | 180,000 × 180,000 | 7,200 | 18,000 |
| 700 × 700 | 350 × 700 | 700 × 700 | 700 × 350 | 245,000 × 245,000 | 9,800 | 24,500 |
| 800 × 800 | 400 × 800 | 800 × 800 | 800 × 400 | 320,000 × 320,000 | 12,800 | 32,000 |
| 900 × 900 | 450 × 900 | 900 × 900 | 900 × 450 | 405,000 × 405,000 | 16,200 | 40,500 |
| 1,000 × 1,000 | 500 × 1,000 | 1,000 × 1,000 | 1,000 × 500 | 500,000 × 500,000 | 20,000 | 50,000 |
| 1,296 × 1,296 | 648 × 1,296 | 1,296 × 1,296 | 1,296 × 648 | 839,808 × 839,808 | 33,592 | 83,980.8 |

In another example, 3D MEMS switches are arranged as multi-plane switches. Multi-plane switches rely on the fact that the transport layer being switched is in a DWDM format and that optical carriers of a given wavelength can only be connected to other ports that accept the same wavelength, or to add, drop, or wavelength conversion ports. This enables a switch to be built up from as many smaller fabrics as there are wavelengths. With DWDM, there may be 40 or 80 wavelengths, allowing 40 or 80 smaller switches to do the job of one large fabric.

Figure 13:
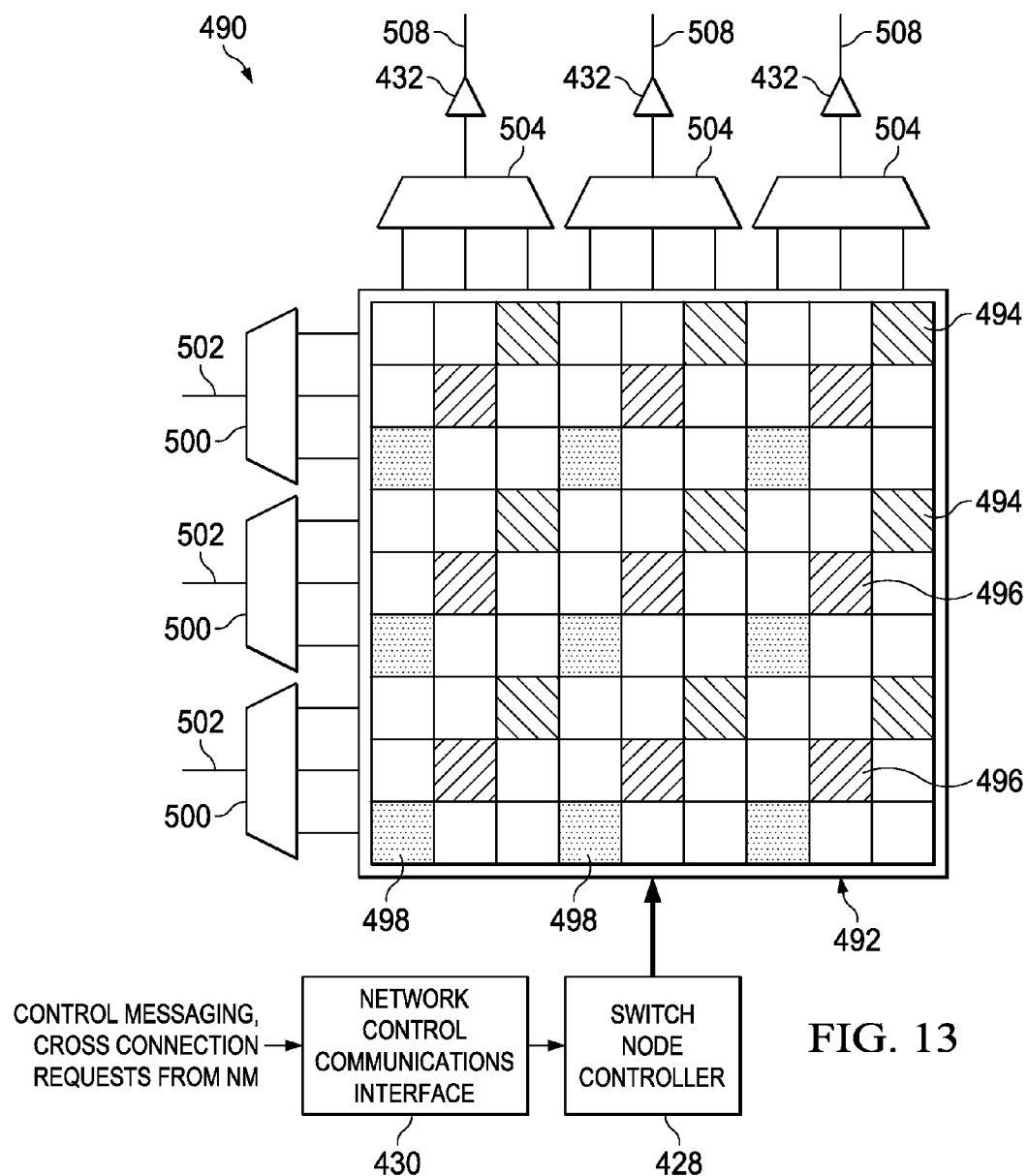
FIG. 13 illustrates another photonic switching structure.

FIG. 13 illustrates photonic switching structure 490 for multi-plane switching. Photonic switching structure 490 has WDM demultiplexers 500 coupled to inputs 502 and WDM multiplexers 504 coupled to outputs 508. Also at outputs 508 are optical amplifiers 432, to reduce optical loss. Regions 492, 494, 496, and 498 switch different wavelengths. Photonic switching structure is a single fabric WDM photonic switch that demands a very large fabric. For example, a 32 fiber, 80 wavelengths per fiber switch would require a 2560 by 2560 port fabric. Such a fabric is inefficient, because not all the crosspoint connections may be used.

Figure 14:
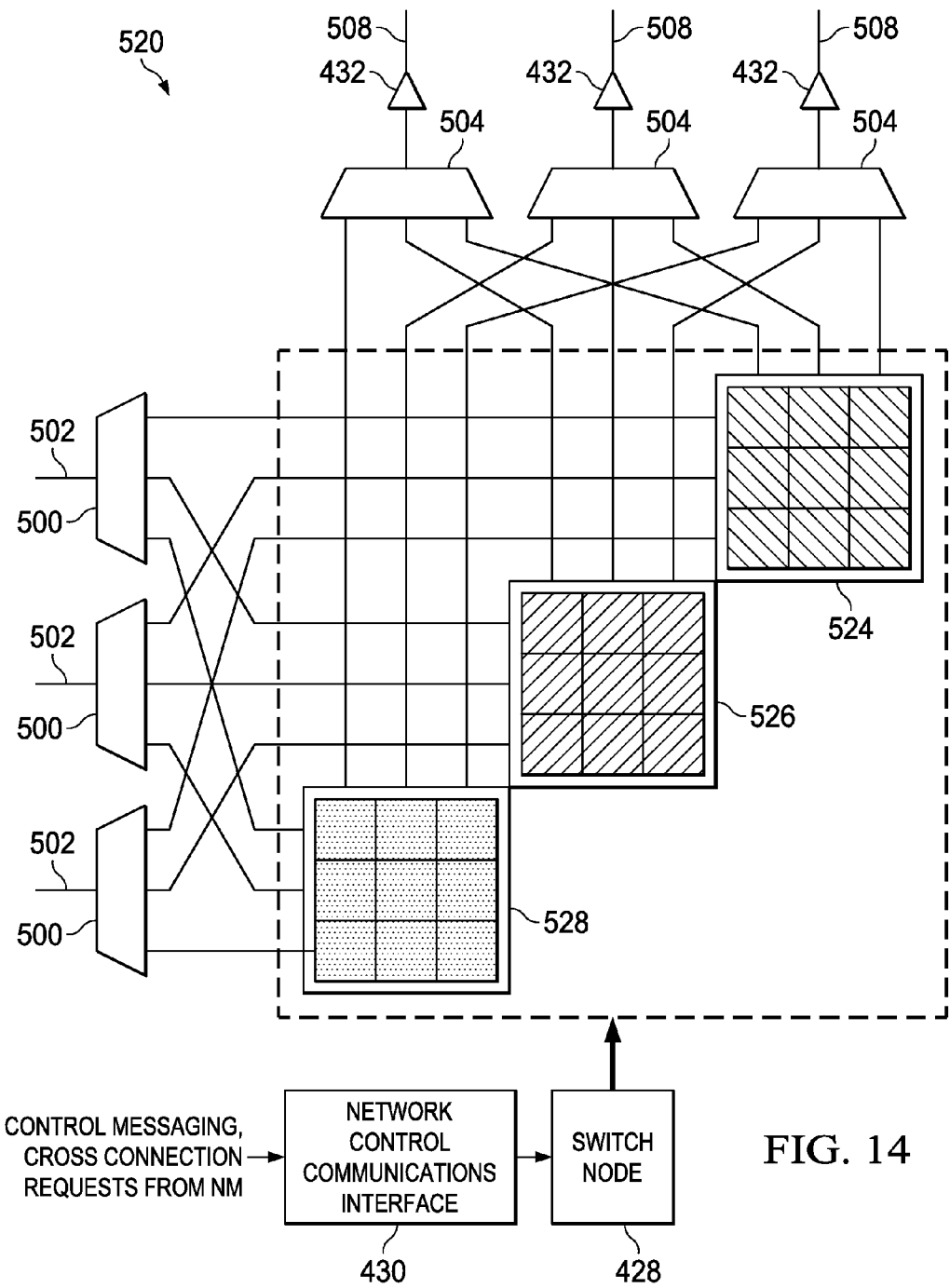
FIG. 14 illustrates an additional photonic switching structure.

FIG. 14 illustrates photonic switching structure 520, also for multi-plane switching. The inputs and outputs to similar wavelengths are grouped together, creating zones in the photonic switching fabric, such as zone 528, zone 526, and zone 524. Because these zones are self-contained, and no legal connections to a zone originate from anywhere else in the fabric, the unusable crosspoints can be eliminated, and each zone becomes a standalone smaller switching fabric. This facilitates a single large switching fabric being replaced with N smaller ones, where N is the number of wavelengths per fiber. These smaller fabrics are 1/N the size of the larger fabric. For example, with 32 fibers and 80 wavelengths per fiber, and a 2560 by 2560 port fabric, there are eighty 32 by 32 port fabrics. Also, optical amplifiers 432 are used to compensate for losses of the switches, the WDM demultiplexers, and the WDM multiplexers.

Table 3 below illustrates the capacity of a multi-plane switches with no inter-plane connectivity in a DWDM application as a function of WDM wavelength count and MEMS switch size. With MEMS switching modules having 320 by 320 ports and 80 wavelengths, a plane based switch of up to 25,600 by 25,600 may be created. With add/drop and wavelength conversion, this is reduced to around 17,000 by 17,000 ports.

Multi-stage switches are more generic than multi-plane switches, because they do not assume a DWDM structure. However, multi-plane switches cause less optical loss than multi-stage switches, because they have one switching stage instead of three. Also, multi-plane switches are directly addressable, and use one third to one quarter the crosspoint resources.

TABLE 3

| MEMS Technology | MEMS Size | Switch Capacity At 10λ (CWDM) | Switch Capacity At 20λ (Sparse DWDM) | Switch Capacity At 40λ (DWDM) | Switch Capacity At 80λ (DWDM) |
|---|---|---|---|---|---|
| 3D-MEMS | 50 × 50 | 500 × 500 | 1,000 × 1,000 | 2,000 × 2,000 | 4,000 × 4,000 |
| | 96 × 96 | 960 × 960 | 1,920 × 1,920 | 3,840 × 3,840 | 7,680 × 7,680 |
| | 100 × 100 | 1,000 × 1,000 | 2,000 × 2,000 | 4,000 × 4,000 | 8,000 × 8,000 |
| | 192 × 192 | 1,920 × 1,920 | 3,840 × 3,840 | 7,680 × 7,680 | 15,360 × 15,360 |
| | 200 × 200 | 2,000 × 2,000 | 4,000 × 4,000 | 8,000 × 8,000 | 16,000 × 16,000 |
| | 300 × 300 | 3,000 × 3,000 | 6,000 × 6,000 | 12,000 × 12,000 | 24,000 × 24,000 |
| | 320 × 320 | 3,200 × 3,200 | 6,400 × 6,400 | 12,800 × 12,800 | 25,600 × 25,600 |
| | 400 × 400 | 4,000 × 4,000 | 8,000 × 8,000 | 16,000 × 16,000 | 32,000 × 32,000 |
| | 500 × 500 | 5,000 × 5,000 | 10,000 × 10,000 | 20,000 × 20,000 | 40,000 × 40,000 |
| | 700 × 700 | 7,000 × 7,000 | 14,000 × 14,000 | 28,000 × 28,000 | 56,000 × 56,000 |
| | 1,000 × 1,000 | 10,000 × 10,000 | 20,000 × 20,000 | 40,000 × 40,000 | 80,000 × 80,000 |
| | 1,296 × 1,296 | 12,960 × 12,960 | 25,920 × 25,920 | 51,840 × 51,840 | 103,680 × 103,680 |
| 2D-MEMS | 8 × 8 | 80 × 80 | 160 × 160 | 320 × 320 | 640 × 640 |
| | 12 × 12 | 120 × 120 | 240 × 240 | 480 × 480 | 960 × 960 |
| | 16 × 16 | 160 × 160 | 320 × 320 | 640 × 640 | 1,280 × 1,280 |
| | 24 × 24 | 240 × 240 | 480 × 480 | 960 × 960 | 1,920 × 1,920 |
| | 32 × 32 | 320 × 320 | 640 × 640 | 1,280 × 1,280 | 2,560 × 2,560 |

Figure 15:
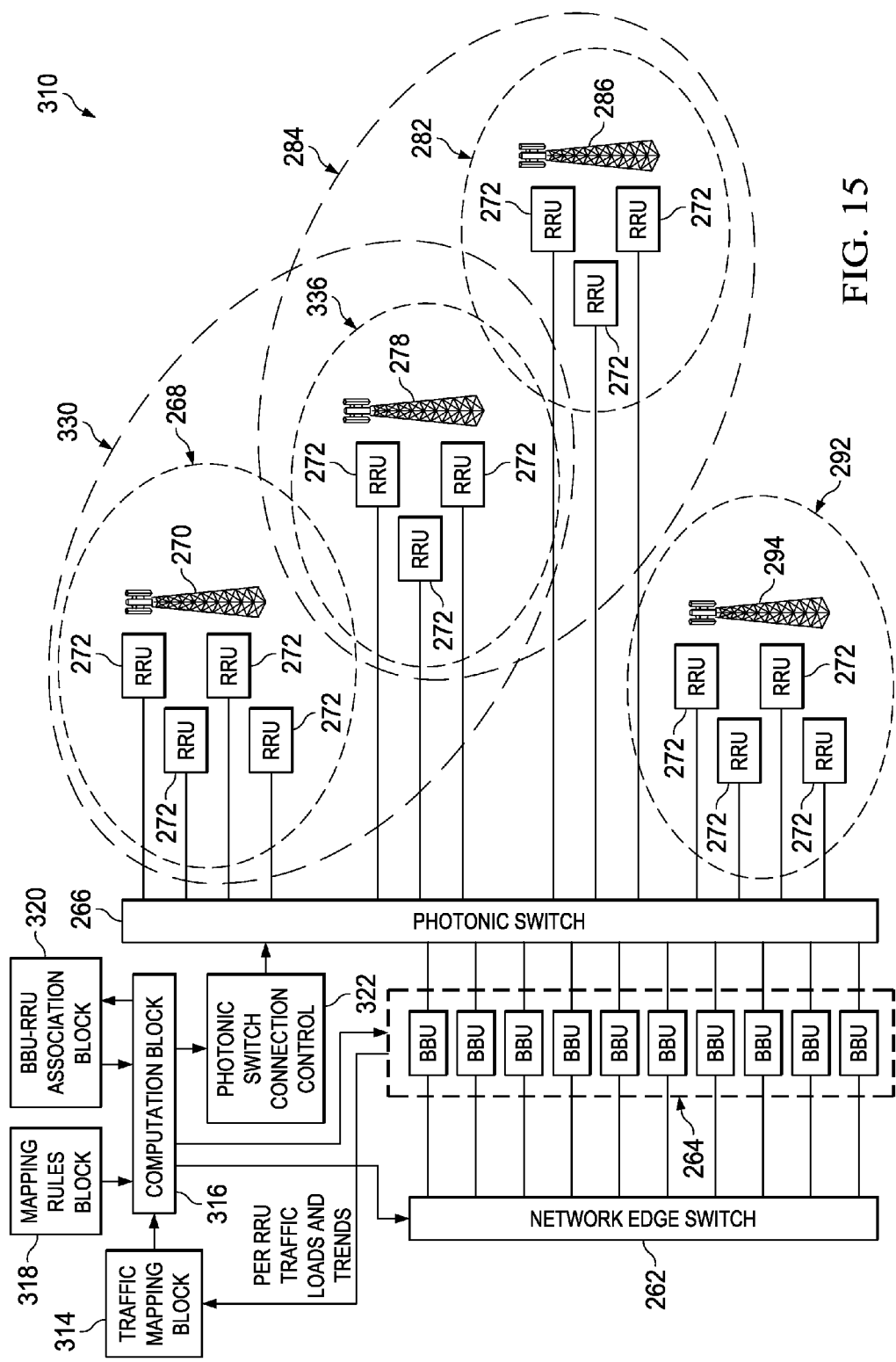
FIG. 15 illustrates an additional embodiment system for C-RAN.

FIG. 15 illustrates C-RAN 310, which is similar to C-RAN 260. Initially, antenna 278 has a coverage area 336, antenna 286 has a coverage area 282, and antenna 270 has a coverage area 268. Expanding the coverage of antenna 286 from coverage area 282 to coverage area 284 and expanding the coverage area for antenna 270 from coverage area 268 to coverage area 330 allows antennas 286 and 270 to cover the area that was covered by antenna 278. Thus, the powering down of antenna 278 is compensated for.

Additionally, C-RAN 310 illustrates an example active control mechanism for a real-time adaptive control of the BBU-RRU mapping. This control mechanism facilitates a response to time of day programmed mapping, responses to unanticipated or predicted traffic hot spots, and adaptive responses to changing traffic patterns. Also, the control mechanism may facilitate shutting down un-needed BBUs, RRUs, and/or antenna sites, or reconfiguring BBUS and/or RRUs in response to failures of BBUs, RRUs, or other equipment or plant failures.

BBUs 264 already provide all the service level management, traffic flow management, association of end-user devices with specific cell sites (RRUs), etc. As such, they would already have an ability to measure their average and peak real time traffic loads and the number of wireless user devices attached to their RRUs. This information stems from the active per user flows and the capacity of the active traffic packets on the overall input to the BBUs.

In the System 310, shown in FIG. 15, BBUs 264 feed their current measured traffic load level to traffic mapping block 314. Then, traffic mapping block 314 collects data from the BBUs about their current or recent traffic loads, and hence their associated RRU or antenna site loads. This may be done as a system wide snapshot, or by scanning the in service BBUs in sequence to collect their average or peak traffic data since the last collection with a set time interval. The set up time interval may be from a few seconds to a few minutes. BBUs 264 are ranked in order based on their traffic load. For example, BBUs 264 may be separated into BBUs operating at close to their capacity limits, for example above a first threshold, BBUs operating at a very low load, for example below a second threshold, and BBUs operating with an intermediate load, for example between the first and second threshold. In another example, the BBUs may be ranked by traffic load for each interval or a time history of each BBU over several intervals. This may be useful in determining changing load conditions and repeated patterns. For instance, forming a view over multiple 24 hour periods allowing the prediction of approximate traffic levels at any specific moment during weekdays or weekends, enabling a time-of-day traffic forecast and a planned response to that forecast. Alternatively, a list of BBUs may be produced showing the largest changes in traffic level measured over several samples. The BBUs and associated RRUs with the highest loads are candidates for reinforcement, while BBUs and associated RRUs with low traffic loads are candidates for being taken out of service, once their traffic is offloaded to a nearby RRU. To facilitate these changes, traffic mapping block 314 creates an RRU activation target map that has the ideal level of active RRUs per antenna site to handle the predicted or measured traffic loads across the entire network. Alternatively, for a time of day forced allocation, traffic mapping block 314 feeds the time of day traffic levels, expressed in terms of RRUs per antenna site instead of the actual measured traffic levels.

The RRU activation target map is fed to computation block 316. Computation block 316 computes options for an idealized BBU-RRU mapping and compares the options to the current BBU-RRU mapping from BBU-RRU association block 320. The purpose of this step is to identify the changes in provisioned capacity level, and hence the new RRU level activation map, while also disrupting or changing the minimum number of connections. Preferably only lightly loaded connections are changed once traffic has been handed off to another nearby RRU, to preserve continuity of service. In an example, BBU-RRU association block 320 is a processor which creates the options for a target map in memory. Also, BBU-RRU association block 320 tracks which RRUs are not in service but are available for use, so that these may be utilized in the realization of the target capacity map.

Computation block 316 then computes the changes both in the number of RRUs per site and in the mapping to achieve the revised traffic levels. Decisions on how to change the BBU-RRU connectivity to achieve the traffic characteristics are performed in accordance with mapping rules block 318, which provides algorithms and rules to control and minimize changes and disruptions while handling the traffic load and minimizing optical path lengths. These algorithms and rules may have many rules or aspects, such as differences below a certain threshold should be ignored, moving BBUs from active to inactive is better or worse than moving BBU between activities, or to minimize the number of BBU moves. It is desirable to prevent cycling between the pool of active BBUs and the pool of inactive BBUs. Some form of hysteresis may be built in to the algorithms to facilitate this.

Computation block 316 derives its action plan by applying the rules and algorithms of mapping rules block 318 to the required changed traffic capacity target map from the traffic mapping block 314. Mapping rules block 318 contains a set of rules and algorithms for setting up, changing, and taking down connections between BBUs and RRUs. Mapping rules block 318 may include the use of real time and/or historical data about traffic levels, the rate of change of traffic levels, and the physical layout and spacing between RRUs. It also considers the changes to the network edge switch 262, the photonic switch connection map, and the BBUs.

Computation block 316 also receives the physical layout of the network. The physical layout of the network may be stored in mapping rules block 318, BBU-RRU association block 320, or a separate block (not pictured). The physical placement and coverage areas of the RRUs and information necessary to identify which RRUs can support, replace, or augment other RRUs is stored, for instance with the BBU-RRU association map. An RRU can cover for shut down RRUs that share the same antenna site. Also, an RRU may be repurposed to cover RRUs at neighboring antenna sites if their coverage can be extended as shown in FIG. 15 for antennas 270 and 286. Because RRUs are fixed, they can best substitute for RRUs at the same antenna site, or less efficiently at neighboring antenna sites.

In one example, a BBU-RRU pair is taken out of service. When a BBU-RRU link to an antenna site having low traffic levels, as determined by management measurements, is to be shut down, the BBU-RRU mapping algorithm from mapping rules block 318 applied by computation block 316 notifies the BBU associated with the RRU. The BBU may be removed from service after it hands off its traffic to other BBUs associated with RRUs near its associated RRU. In one example, this is a forced change of association. In another example, this is achieved by ramping down the RRU power triggering a change of association similar to the change of association when a device goes out of range of a cell site, or another hand off mechanism. Once the service is disconnected from the BBU, the photonic switch connection between them is removed, and the BBU, RRU, and appropriate switch ports are entered into the BBU-RRU mapping field in BBU-RRU Association block 320 as spare out of service resources. Photonic switch 266 may also be instructed to periodically apply a connection from a test system (not shown) to check that the out of service RRU is still functional to avoid a silent failure. The BBU is now marked in BBU-RRU mapping block, for example as "unassociated—available for use," while the RRU is marked, for example as "unassociated—disconnected good inventory." Other RRUs in the same antenna site, and their corresponding BBUs handle the traffic previously supported by the BBU-RRU pair that has been taken out of service.

In another example, the traffic for an antenna site falls to such a low level that it is not worthwhile to keep any RRUs in that site alive. Alternatively, the entire site may need to be taken out of service for maintenance or other reasons. In this case, all of the RRUs from the antenna site are disconnected by forced handoffs to another site. This may be done by ramping down the power to trigger a hand-off. A neighboring cell which is also experiencing low traffic can pick up the traffic load being handed off by extending the range of one or more of its RRUs. This may be done by changing the antenna gain, for example beam forming, in the direction of the antenna site to be taken out of service. Alternatively, this is done by changing the modem constellation on one or more of its RRUs to a more rugged consternation. For example, a 256 QAM modem signal may be reduced to 64 QAM or 16 QAM, or a 64 QAM signal may be reduced to a 16 QAM signal, a 4 QAM, or a quadrature phase shift keying (QPSK) signal, reducing the traffic carrying capacity by extending its range. Such a change may be done, for example, in the middle of the night, when all traffic is low.

In another example, a BBU-RRU pair is servicing the traffic load within an antenna site coverage area, but the traffic level rises, and crosses a threshold. It is now necessary to provide relief before overloading occurs. Computation block 316 analyzes the data from the BBU-RRU links and identifies from the traffic loading and a response algorithm from mapping rules block 318 that an action is needed. Computation block 316 consults with BBU-RRU association block 320 to obtain a list of spare RRUs and the locations of the spare RRUs from the RRU location map. When computation block 316 determines that one of the spare RRUs is in the same antenna site as the RRU that is approaching overload, it consults mapping rules block 318 to identify a spare BBU. Next, it marks that BBU for service, instructs photonic switch 266 via photonic switch connection control block 322 to connect that BBU to the spare RRU, and notifies network edge data switch 262 that the BBU is now active, and can accept streams. Once the new RRU is active, some of the traffic of the other RRUs will be transferred to it. Alternatively, some traffic may be forced to transfer, for example by a load-balancing or hand-off process.

To implement the changes, computation block 316 writes the changes to BBU-RRU association block 320. Also, computation block 316 causes photonic switch connection control block 322 to appropriately set the connections in photonic switch 266 to implement the new mapping. Photonic switch connection control block 322 maps the BBU-RRU connection request from computation block 316 into physical photonic switch port connections. Also, photonic switch connection control block 322 implements and validates those switch port connections on the photonic switch. For example, when a photonic switch based on a CLOS switch architecture without WDM is used, the ports of the RRUs and BBUs are connected to photonic switch 266, a free path search across the CLOS switch stage to identify the appropriate switch state setting is applied.

Figure 16:
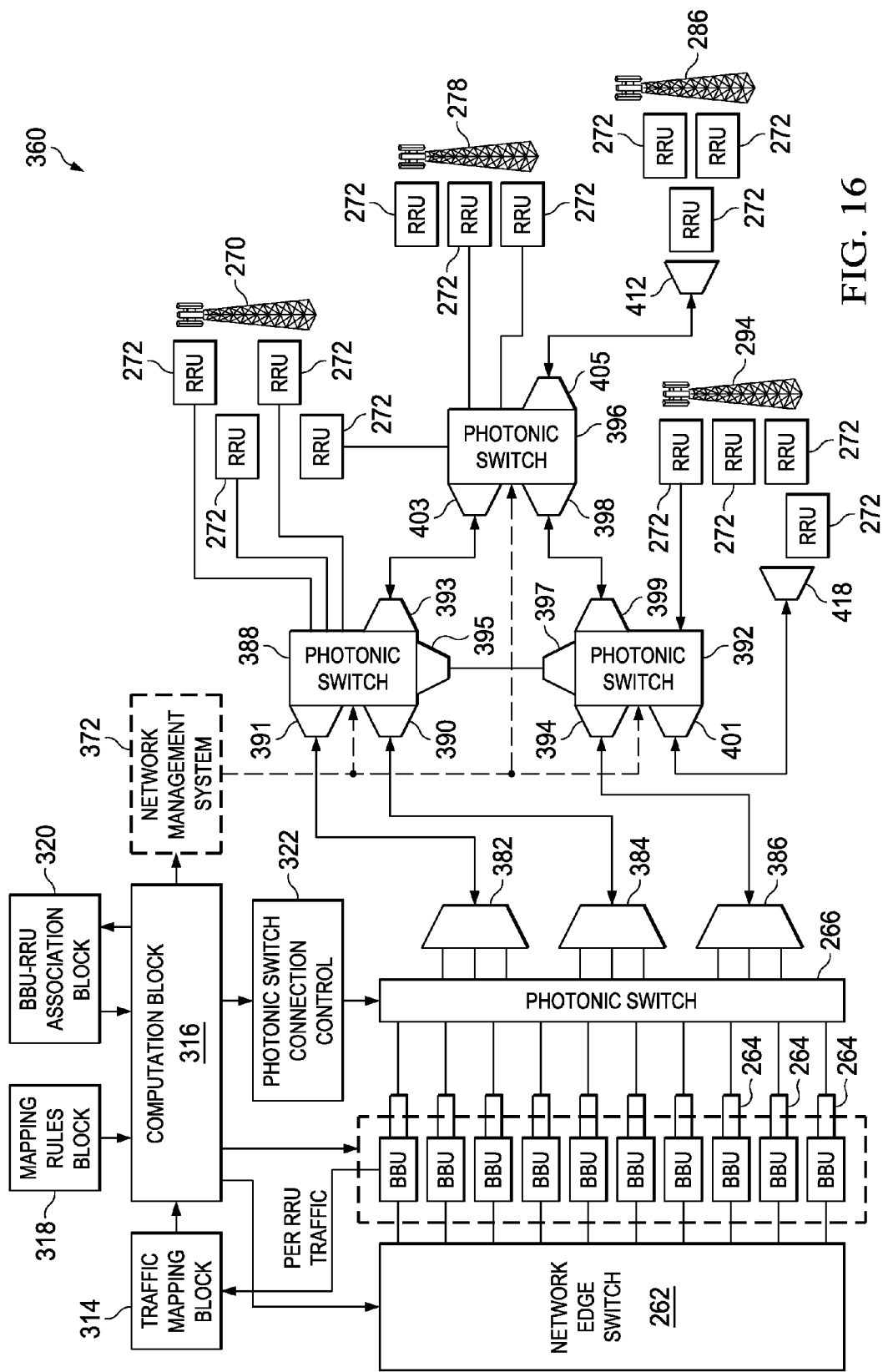
FIG. 16 illustrates another embodiment system for C-RAN.

In a large network, directly connecting fibers or wavelengths to the primary photonic switch associated with the BBUs is wasteful of fiber or wavelength capability and connection bandwidth. Multiple optical carriers may be carried at different wavelengths on a single fiber, for example using coarse wavelength division multiplexing (CWDM) or DWDM. Multiple direct BBU-RRU links can then be carried on a single fiber. However, as the BBU-RRU connectivity map changes in response to shifting network traffic loads, the optical carrier links may need to be moved to better use the fiber and wavelength network. FIG. 16 illustrates C-RAN 360 with multiple photonic switches, which may be used to allow further re-routing of BBU-RRU links. It should be understood that, while FIG. 16 shows four photonic switches, this could be expanded to be a mesh network across any size of metropolitan area.

C-RAN 360 contains multiple photonic switches, including photonic switch 266 near BBUs 264, and photonic switches 388, 392, and 396 in remote sites. C-RAN 360 may be useful in a metropolitan area of over a few hundred thousand people, and up to the largest metropolitan areas. For example, tens of millions of people are served by a large mesh of photonic switch connecting hundreds or thousands of RRU sites to one or more centralized massive array of BBUs housed in one or more BBU sites. The additional photonic switches enable additional features without introducing significant extra delay or jitter.

C-RAN 360 as illustrated is a basic switched mesh network. However, other network topologies, such as tree-and-branch and duplicated tree-and-branch topologies may be used. Depending on the number and location of head-end BBU sites, a tree-and-branch structure may be appropriate for the case of a single BBU site. Both mesh networks and tree-and-branch networks provide shorter more direct routing, leading to less transmission delay over the optical fiber than a ring-based network. In one example, photonic switches feed wavelengths directly to RRU sites by dedicated ongoing fibers. In another example, photonic switches provide a wavelength group of optical carries with WDM demultiplexing local to the RRU group. Alternatively, the RRUs are fed from the switch by a WDM passive optical network with a field mounted optical wavelength splitter/combiner.

As pictured, network management system 372 coordinates and controls the switching of photonic switches 388, 392, and 396. Alternatively, other control structures may be used. Network management system 372 manages the optical transport network and identifies the required link components to be concatenated to create network paths. Also, network management system 372 identifies spare unused links and establishes the connection settings in automated cross-connects or switches along the path. Network management system 372 establishes the lowest delay connectivity, and establishes and ranks the order of BBU-RRU connections based on delay. The delay is a function of the optical path length of the links, which is substantially larger than the delay from the photonic switches. Thus, network management system 372, when it provides a new path, provides the path with the shortest concatenated set of fiber links resulting in the lowest delay. As an illustration of how the fiber delay dominates over the photonic node delay, the optical path through a complete bay of photonic switching equipment, (enough physical space to support a massive 2,560×2,560 wavelength switch, more than would be needed in any application except the biggest nodes), is measured in meters, for example around three to four meters. However, the distance between the switch nodes may be from three to twenty km in a metropolitan application. Since the speed of light is approximately the same in the optical circuits of the photonic switch and in the core of the fiber, the delay caused by the fiber is in excess of three orders of magnitude greater than the delay in the photonic switch. The delay though the photonic switch is likely to be of the order of 15 nanoseconds, whereas over five km the delay is around 25 microseconds.

Traffic mapping block 314 feeds real time traffic measurements from the BBUs associated with in-service RRUs to computation block 316 after processing the data. Computation block 316 then applies algorithms and rules to the data from mapping rules block 318. Also, computation block 316 decides whether to change a connection, and if so, what the change will be. When a change will be performed, computation block 316 consults BBU-RRU association block 320 and locates an RRU to be added. The RRU may be at the same antenna site or a neighboring antenna site. Computation block 316 determines the RRU to add and a BBU to be associated with that RRU.

Instead of setting one photonic switch, multiple photonic switches are set to create the new BBU-RRU connection. Computation block 316 notifies network management system 372 of the new connection, including the identity of the RRU to be connected and the options for source ports from the bank of BBUs. The RRU to be connected is a device known to network management system 372. Also, network management system 372 maintains a map of utilized and unutilized network side ports for photonic switch 266.

Network management system 372 computes the available paths between the unutilized BBUs and the requested RRU. Because the RRU is fed from a single demultiplexed optical port of a DWDM wavelength demultiplexer, it operates at a fixed wavelength. Network management system 372 only searches the unutilized BBUs associated with photonic switch ports that are connected to the same wavelength. Once the candidate paths are located, they are analyzed for delay by adding up the delays of the constituent links. Network management system 372 then sets up the photonic switches to concatenate links to create the shortest delay end-to end path available, and creates the selected path from the BBU to the RRU. Computation block 316 notifies photonic switch connection control 322 to make the appropriate connection in photonic switch 266. Also, computation block 316 provisions the BBU transmission wavelength to match the allocated DWDM channel that matches the corresponding RRU wavelength port. A tunable source, such as a tunable laser feeding an electro-optic modulator, or a centralized optical carrier generator generating a number of optical carriers distributed across the BBUs may be selected for use by the BBU based on its provisioning.

In C-RAN 360, port 382, which contains WDM multiplexing, is coupled to port 391 of photonic switch 388, while port 384 is coupled to port 390 of photonic switch 388 via an outside plant fiber cable span. Also, port 386 is coupled to port 394 of photonic switch 392 via an outside plant fiber cable span. Also, port 393 of photonic switch 388 is coupled to port 403 of photonic switch 396 via an outside plant fiber cable span, while port 395 of photonic switch 388 is coupled to port 397 of photonic switch 392 via an outside plant fiber cable span. Additionally, port 399 of photonic switch 392 is coupled to port 398 of photonic switch 396 via an outside plant fiber cable span, and port 401 of photonic switch 392 is coupled to port 418 via an outside plant fiber cable span. Port 405 of photonic switch 396 is coupled to port 412 via an outside plant fiber cable span. These switches are interconnected via outside plant fiber spans of differing physical length, for example from three to twenty kilometers, based upon the location of the photonic switches across the metro area being served. The network management system is aware of these spans, their lengths, and the consequent "time-of-flight" delay of each span. The network management system will seek to determine, from the available spans, which combination creates the shortest path, and hence lowest delay between BBU and RRU, and will preferentially allocate that connection. In practice this network may be extended across a major metropolitan area, and may have more nodes, for example ten to fifty nodes. Multiple route options may exist to any RRU site.

In a traditional metropolitan photonic switched network based on DWDM, when wavelength blocking occurs, a wavelength converter may be used. Wavelength blocking is when there is no ongoing path capacity at a specific wavelength. In this case, the optical carrier may continue to propagate information on a different wavelength. However, wavelength conversion is an optical-electrical-optical function, and would introduce some delay and significant jitter.

In one example, to avoid this optical-electrical-optical function, if the lowest delay route is blocked at a certain wavelength due to other traffic at this wavelength, but other slightly longer routes are not blocked, then one of those routes may be chosen. This is facilitated by a degree of overprovisioning in terms of wavelength capacity, photonic switches, and cabling, but not of electro-optics. This creates spare capacity in a manner similar to a dilated switch node, but at a network level. Thus, all routes within a maximum tolerable delay may be searched, and another acceptable route is chosen.

In another example, the use of wavelength allocation algorithms in the mapping of BBU-RRU links, such as the probability of wavelength blocking, reduces wavelength blocking. Where there are multiple RRUs at an antenna site, those with the least used wavelength values are preferentially chosen to load balance the wavelengths and reduce the probability of wavelengths becoming congestion on multiple paths. This is to prevent RRU isolation in the case of spare resource RRUs which may be connected to the network.

In an additional example, the provisioning of excess capacity is used to reduce wavelength blocking. This may include additional fibers and switch ports. This may be useful when there are many wavelengths.

In another example, a protection path to the RRU is provided at a different wavelength value. This may also be done to allow the RRU to remain in service after a transport failure. When the primary wavelength is discovered to be blocked during set up, the protection wavelength is used. The probability of both wavelengths being blocked is small. Because the network is dynamic, it will only be a short time before the primary wavelength connection is recovered and allocated to the RRU.

In an additional example, a tunable optical filter may be used in place of the DWDM demultiplexer at the RRU. Then, the RRU can be provisioned to use any wavelength. This solution uses a tunable optical source.

The use of photonic switches in a C-RAN network enables multiple optical paths to exist between BBUs 374 and RRUs 272. Under normal operation, the optically shortest route between the RRU and the BBU is used. However, when a cable is cut or there is another outage, the photonic switches may be configured to bypass the outage and reconnect the RRU to a BBU via the shortest operational optical path.

Figure 17:
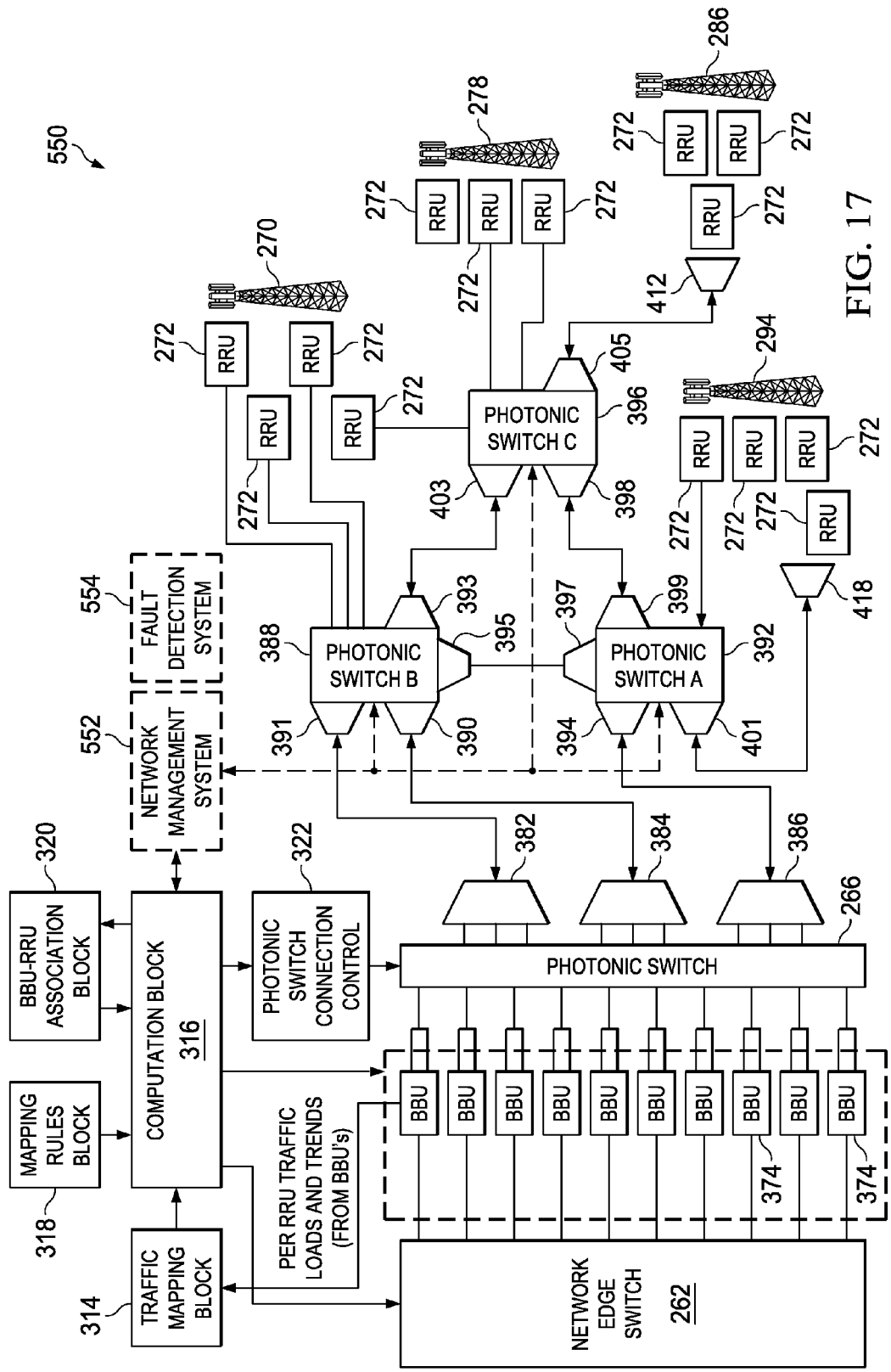
FIG. 17 illustrates another embodiment system for C-RAN.

FIG. 17 illustrates C-RAN 550, which contains fault detection system 554. Fault detection system 554 receives status reports and alarms from the switching nodes. As pictured, these alerts come from network management system 552. In another example, the alerts come via automatic reporting paths. Based on this information and the current connection path from network management system 552, fault detection system 554 detects and declares failures. Also, fault detection system 554 identifies the failed network component or link, for example down to a maintenance entity, such as a fiber span, a switch node, or a part of a switch node, such as a DWDM port function. The location of the failure is then used to compute which optical paths and links have been affected by the failure. Routes are re-planned through other links for the affected optical carriers, using spare network capacity. Once this determination is made, network management system 552 communicates with photonic switches 388, 392, and 396, and with the BBU management system. In particular, computation block 316 sets up new paths as needed.

When a fault occurs, network management system 552 receives alarms, which it forwards to fault detection system 554. Fault detection system 554 analyzes the alarms and other inputs from the network to identify the link or node that has failed. When a node or part of a node has failed, the node usually will report its failure. Then, fault detection system 554 advises network management system 552 of the node or link that has failed. Network management system 552 then reviews the connected paths, for example stored in a form of connected path table, to determine which paths are routed through the failed link or node. Network management system 552 advises the end users of the photonic switched network of the outage. Next, computation block 316 controls the C-RAN configuration. Network management system 552 takes each identified route through the failed point, computes a new path for this route, and advises computation block 316 of the changes to the setting. Meanwhile, BBUs 374 report the loss of connectivity as an alarm state to computation block 316. Computation block 316 queries network management system 552 as to whether good communications are in place across the network. When there is a problem, such as a node or link failure, computation block 316 reconnects the failed links. When network management system reports a good optical connection when an RRU has disappeared from its BBU host, the RRU is presumed to have a fault. In this case, computation block 316 determines and connects an appropriate replacement RRU.

Figure 18:
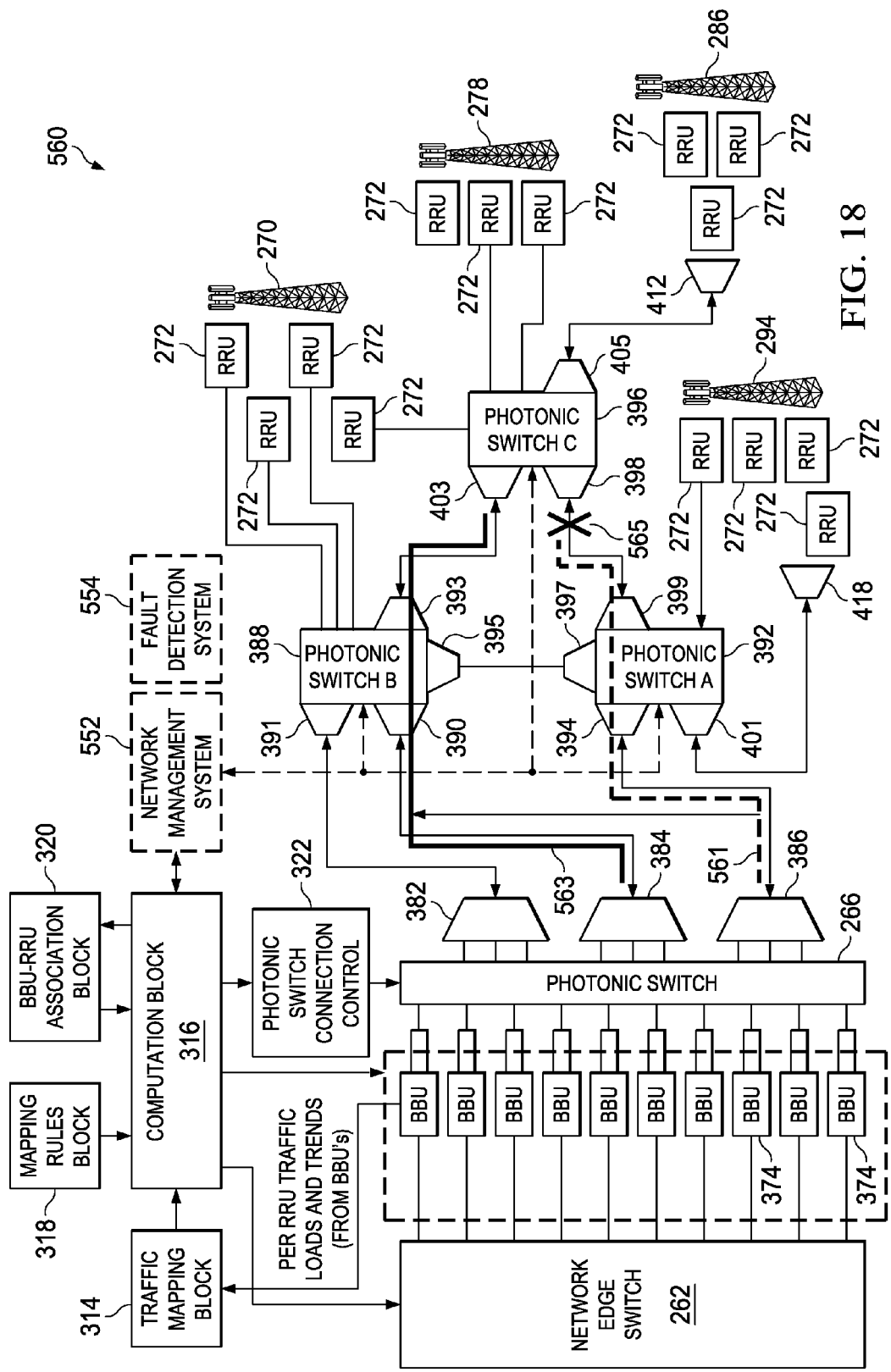
FIG. 18 illustrates an additional embodiment system for C-RAN.

FIG. 18 illustrates an example C-RAN 560 undergoing a photonic layer failure. Initially, path 561 passes from photonic switch 266 through photonic switch 396. However, in path 561, there is a failure 565. A restored path is illustrated by path 563. When failure 565 occurs, photonic switch 396 reports a loss of an incoming signal on certain provisioned ports. Also, photonic switch 392 reports a loss of signal on certain upstream path ports from photonic switch 396. Fault detection system 554 determines that all connectivity between photonic switch 388 and photonic switch 396 are lost, for example due to a cut cable. Fault detection system 554 and network management system 552 plans the shortest possible new route for each of the affected wavelengths using the available spare capacity. Thus, path 561 is rerouted to path 563.

C-RAN 560 could have restored the path by going from photonic switch 266 through photonic switch 392 to photonic switch 388, then to photonic switch 396. However, this would have added an extra switch in the path and extra outside plant cable distances, thus adding extra propagation delay. By instead connecting the path from photonic switch 266 to photonic switch 388, then to photonic switch 396, the delay is reduced. To take into account the delays, network management system 552 should be aware of the optical span lengths, and hence the propagation delays in the network. The delay from the speed of light in glass is significantly larger than the delay through a switch node. The speed of light in glass fibers is about ⅔ c, where c is the speed of light in a vacuum. Therefore, a 1 km span has a delay of about five microseconds, a 5 km span has a delay of about 25 microseconds, and a 20 km span has a delay of about 100 microseconds. On the other hand, a very large optical switch of several bays has an optical path length of about fifteen to twenty meters, having a delay of about 75 to 100 nanoseconds. A single bay switch, with up to about 2000 by 2000 ports, has a delay of about 25 nanoseconds. Thus, the span delays are two to three orders of magnitude larger than the photonic switch delays.

Figure 19:
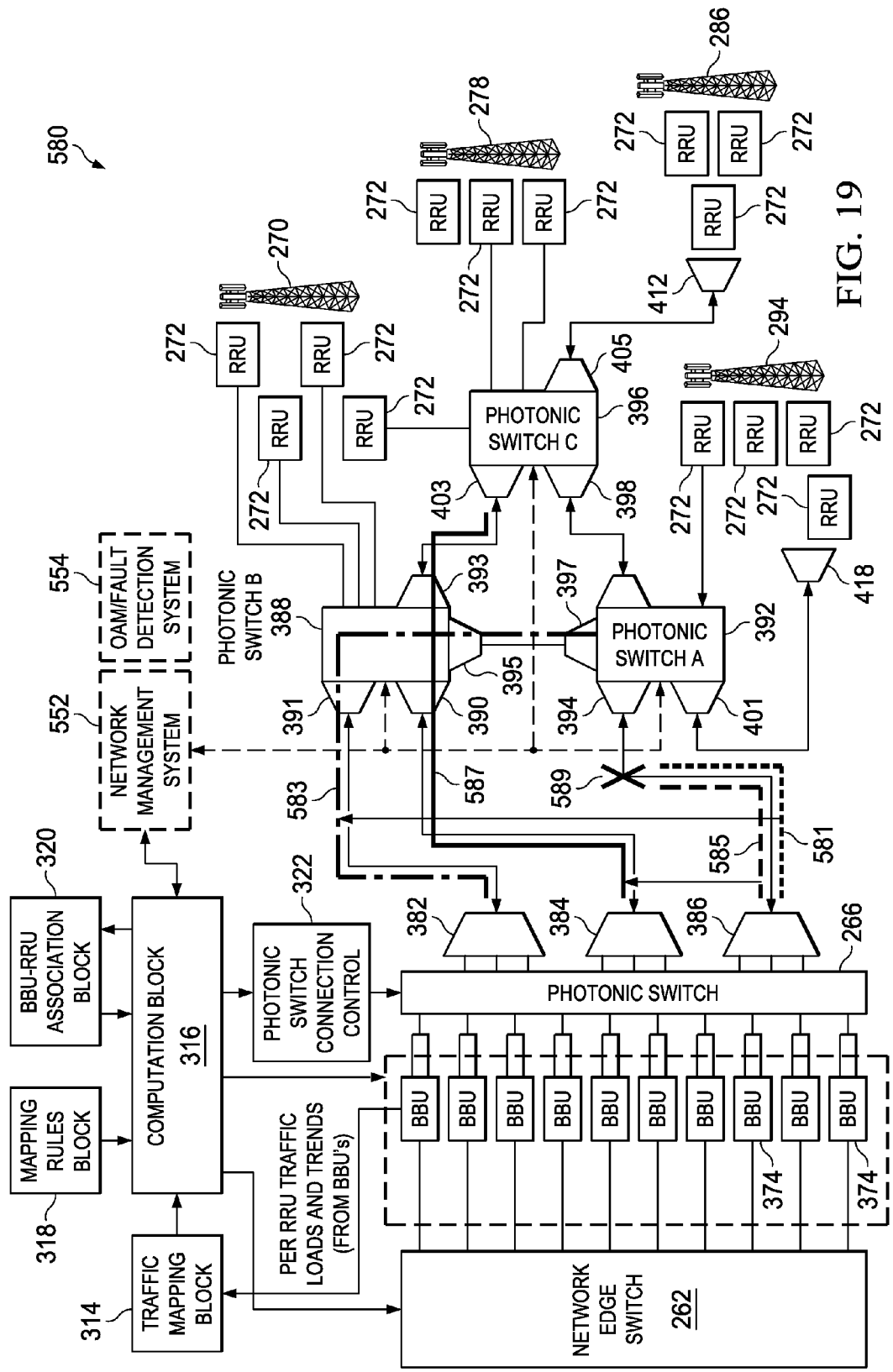
FIG. 19 illustrates another embodiment system for C-RAN.

FIG. 19 illustrates an example of link restoration in C-RAN 580. Two links, link 581 and link 585, are simultaneously taken out by one cable cut failure, failure 589. Link 585 is a red wavelength and link 581 is a green wavelength. Port 384 already has its green wavelength in use, and port 382 already has its red wavelength in use. The shortest path for each wavelength or group of wavelengths is computed and applied. Link 585 is re-routed as link 587 from port 384 of photonic switch 266 to port 390 of photonic switch 388, then from port 393 of photonic switch 388 to port 403 of photonic switch 396. Also, link 581 is re-routed as link 583, going from port 382 of photonic switch 266 to port 391 of photonic switch 388, then from port 395 of photonic switch 388 to port 397 of photonic switch 392.

In another example, the BBUs are located in multiple sites. The diversity in BBU location may be deliberate to avoid a single point of failure risk, such as a building wide power outage, flood, fire, or other disaster from taking out all the BBU resources. Alternatively, this may result from the natural growth of the network and its resources, when a BBU site expands to capacity, and additional BBUs are accommodated in a second site, or when resources of competing carriers are merged or shared, for example after a merger or acquisition.

Flexibility to share capabilities among multiple BBU sites is desirable when multiple BBU sites exist. This may be based on an RRU activity map and the mix of the dominant current services, which changes with the time of day. For example, one BBU complex may be collocated with a streaming video intensive data center, while another BBU complex is collocated with a business services data center. In the evenings, it may make more sense for the BBUs at the streaming data center to be fully loaded, rather than to haul data between the two centers to propagate to the RRUs using a generic backbone switched data center.

Figure 20:
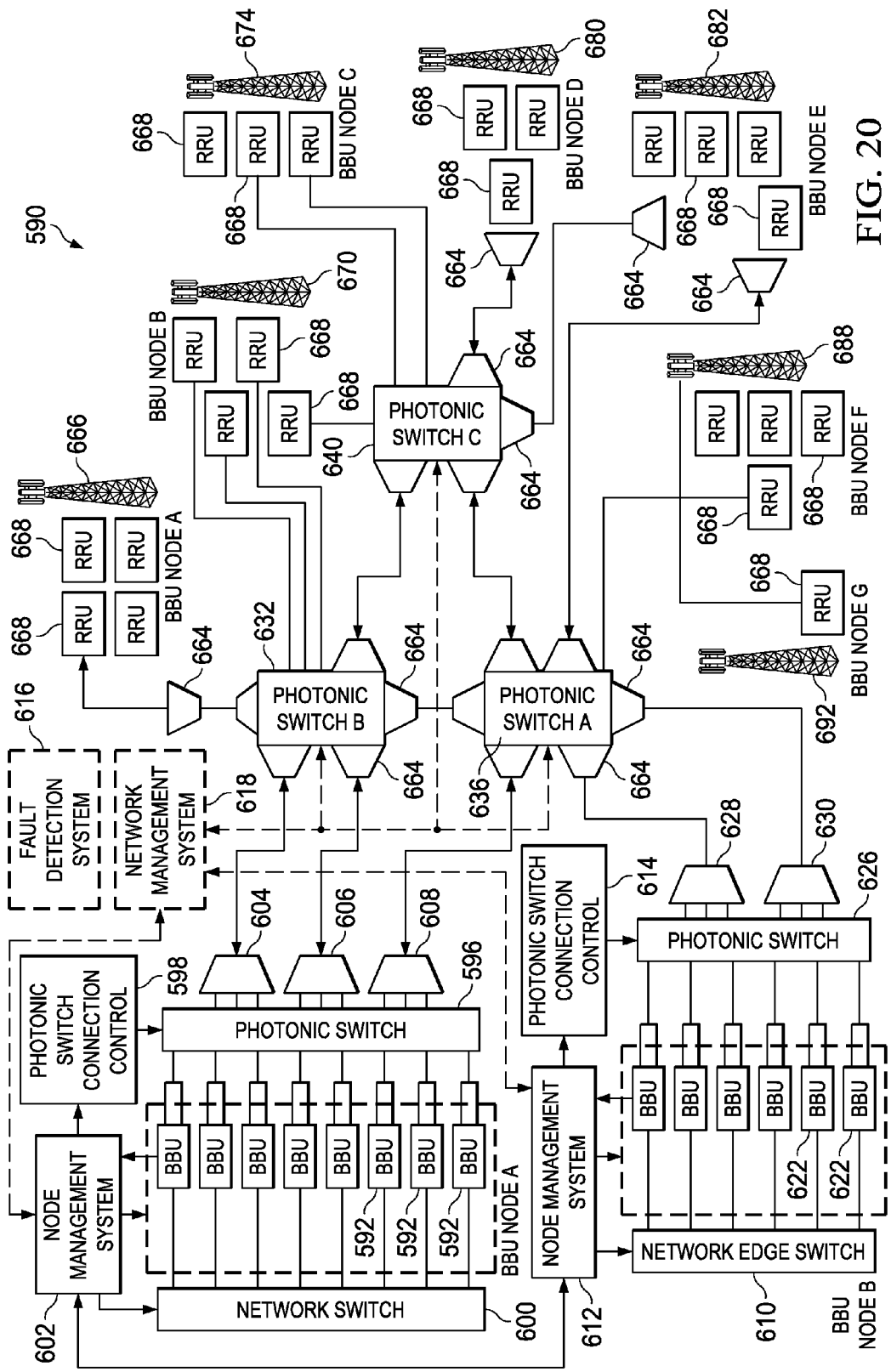
FIG. 20 illustrates an additional embodiment system for C-RAN.

FIG. 20 illustrates C-RAN 590 containing BBU centers. In C-RAN 590 there is cooperation between BBU management systems, especially when the BBU sites are used as a single resource pool for RRUs throughout the network. Multiple tree structures for the outside plant topology may be used. Other topologies may be used. As the number of BBU sites increases, the network may look like a switched mesh network. This switched mesh network may be merged with the general purpose metro core collector access network that is based on a switched photonic network infrastructure, provided sufficient network capacity exists for the general purpose metro network to provide a broadband switched digital packet network for other users while enough pure wavelengths are retained for the BBU-RRU connections to remain purely in optical space. Wavelength conversion on the BBU-RRU links may be avoided, because such conversion is an electrical-optical-electrical switching function.

In C-RAN 590, BBUs 592 are coupled to network edge switch 600 and photonic switch 596, while BBUs 622 are coupled to network edge switch 610 and photonic switch 626. Also, photonic switch connection control 598 is coupled to photonic switch 596, and photonic switch connection control 614 is coupled to photonic switch 626. Node management system 602 communicates with BBUs 592, photonic switch connection control 598, network edge switch 600, network management system 618, and node management system 612. Additionally, node management system 612 communicates with network edge switch 610, BBUs 622, photonic switch connection control 614, and network management system 618. Network management system 618 also communicates with fault detection system 616, photonic switch 632, photonic switch 636, and photonic switch 640. Antennas 666, 670, 674, 680, 682, 688, and 692 have RRUs 668 clustered around them. Photonic switch 596 has ports 604, 606, and 608, while photonic switch 626 has ports 628 and 630. Ports 664 may be used on photonic switches 632, 636, and 640, as well as by RRU clusters.

When an RRU is disconnected from a BBU, it is invisible to the centralized network resource. In the event of the RRU subsequently failing, the central network resources would be unaware until an attempt is made to reconnect the RRU to a BBU resource, at which time a failure to deliver service would occur. This may be overcome if the photonic switch connects the RRU to a keep alive activation and test system, which periodically tests the RRU functionality when the photonic switch disconnects the RRU from the BBU. The activation and test system may alarm an out of service or spare inventory RRU failure to avoid switching BBU traffic to an unserviceable RRU.

Figure 21:
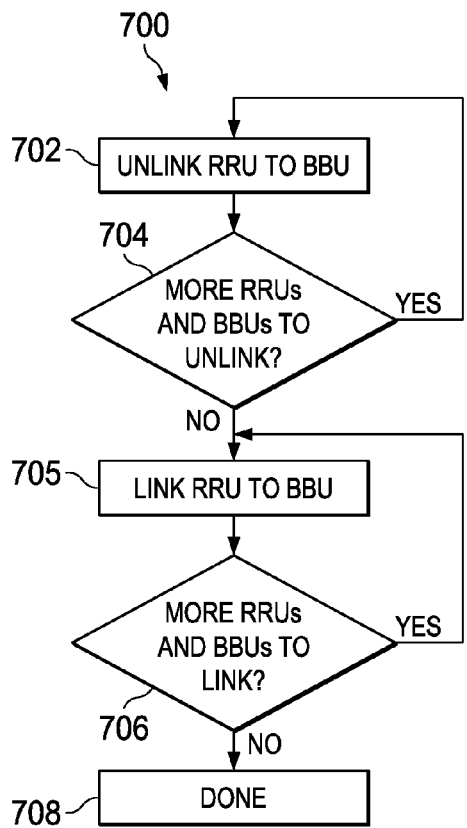
FIG. 21 illustrates an embodiment method of photonic switching in a wireless network.

FIG. 21 illustrates flowchart 700 for a method of linking and unlinking RRUs and BBUs. Initially, in step 702, an RRU and a BBU are unlinked. This may be done, for example, if the BBU or RRU is being taken out of service due to low traffic, or if there is a failure in the link between the BBU and the RRU. Unlinking the RRU from the BBU is done by reconfiguring one or more photonic switch.

After unlinking an RRU from a BBU, in step 704, it is determine if there are more RRUs and BBUs to unlink. If there are more RRUs and BBUs to unlink, another RRU is unlinked from a BBU in step 702. However, if there are no more RRUs and BBUs to unlink, it proceeds to step 705. BBUs and RRUs may be only unlinked, only linked, or both unlinked and linked in a different configuration.

Then, in step 705, a BBU is linked to an RRU. This is done by reconfiguring one or more photonic switch. A change may be triggered by a change in traffic pattern, a daytime schedule, an outage, or another reason that it is desirable to alter the BBU-RRU mapping. Also, this may be done when adding resources or powering up a C-RAN.

Next, in step 706, it is determined if there are more RRUs and BBUs to link. If there are more RRUs and BBUs to link, the system goes back to step 705 to link another RRU with a BBU. However, if there are not more RRUs and BBUs to link, the system goes to step 708, and is done.

Figure 22:
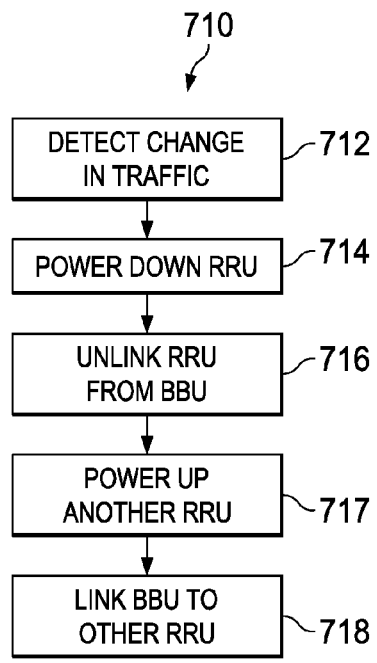
FIG. 22 illustrates another embodiment method of adjusting links in a C-RAN.

FIG. 22 illustrates flowchart 710 for a method of adjusting links in a C-RAN. Initially, in step 712, a change in traffic is detected. This may be based on traffic activity from prior similar events at a given location, such as regular sporting events or concerts. In another example, the measurement of actual traffic activity in the network is collected. Intervals of an hour, ten minutes, one minute, or another time interval may be used, where there is a trade off in network responsiveness and unnecessary churn. A sudden localized massive traffic spike may be recognized. Capacity may be redirected at the request of external agents, for example requests from authorities or emergency services during a disaster. These factors may be collected together and run through network optimization algorithms or processing to determining the best BBU-RRU mapping and the best methods of reconfiguring the current BBU-RRU map to best achieve the target map with a minimum BBU-RRU churn.

Then, in step 714, an RRU is unlinked from an RRU. This may be done when the RRU and/or the BBU will be powered down, or if there is a fault in the link between the RRU and the BBU. The unlinking may be performed by changing connections in one or more photonic switch between the BBU and the RRU.

When there is a change of traffic that indicates that an RRU should be powered down, for example when traffic is low at a particular antenna site, in step 716, an RRU is powered down. For example, in the evening, an RRU in a business district is powered down. In another example, an RRU in a residential district is powered down in the morning. Alternatively, a low traffic load is detected in real time.

When the BBU is to be connected to an RRU that is currently powered down, that RRU is powered on in step 717.

Finally, in step 718, the BBU is connected to a new RRU. This may be done by changing connections in one or more photonic switch. The new BBU-RRU link then conducts traffic. Alternatively, the BBU remains off, and is not connected to another RRU, for example when the traffic load is low.

Figure 23:
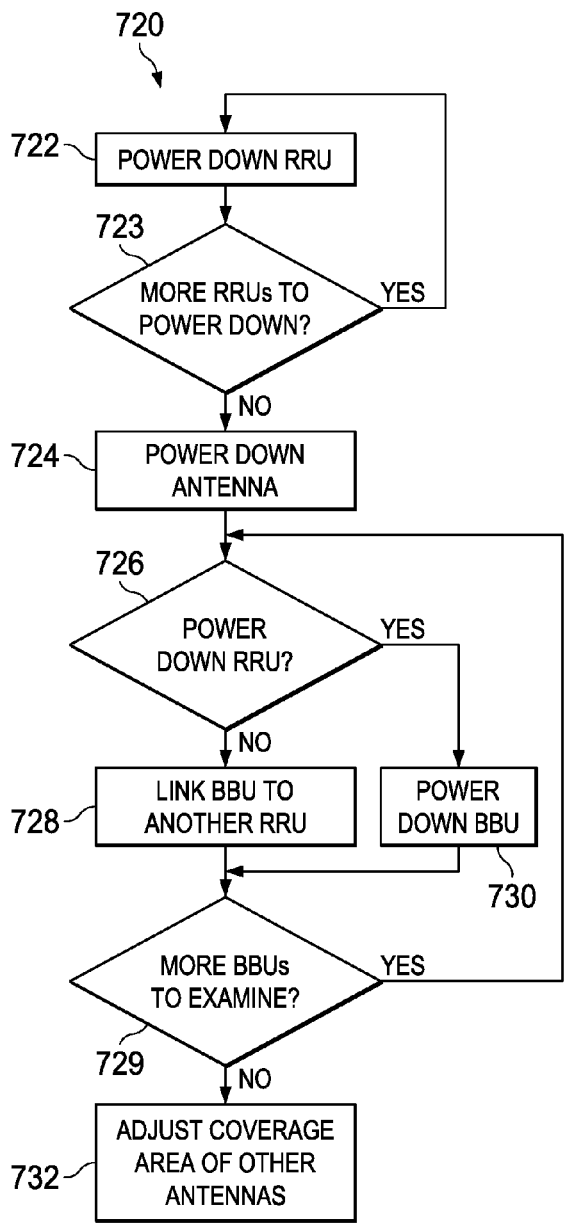
FIG. 23 illustrates an additional embodiment method of adjusting links in a C-RAN.

FIG. 23 illustrates flowchart 720 for a method of rerouting BBU-RRU connections in a C-RAN when an antenna is powered down. Initially, in step 722, an RRU at an antenna site of the antenna to be powered down is powered down.

Then, in step 723, the system determines if there are more RRUs at the same antenna site to power down. When there are more RRUs to power down, the next RRU is powered down in step 723. When there are not more RRUs to power down, the system proceeds to step 724, and the antenna is powered down.

After powering down the antenna, in step 726, the system determines if a BBU that was previously linked to one of the powered down RRUs will be powered down. Shutting down an antenna site may be performed at a very low traffic time, such as the middle of the night. In such a case, it is likely that many of the BBUs may be powered down, because of the reduced power load. However, one or more of the BBUs may be rerouted to another RRU. When a BBU is to be powered down, the BBU is powered down in step 730. On the other hand, when the BBU is not to be powered down, the BBU is linked to another RRU, for example by reconfiguring connections in a photonic switch, in step 728.

After step 730 or step 728, the system determines if there are more BBUs that were previously linked to RRUs that were powered down in step 729. When there are more BBUs to examine, in step 726, it is determined if the next BBU is to be powered down. When there are not more BBUs to examine, they system proceeds to step 732.

In step 732, the coverage on neighboring antennas is adjusted to compensate for the coverage area that was previously covered by the powered down antenna. To compensate, one or more neighboring antenna may increase its coverage area, so there is no gap in coverage. In one example, the additional coverage is provided by beam-forming an adaptive antenna. In another example, the transmission power is increased. Alternatively, the modem characteristics are changed to a hardier but less efficient code. For example, it may migrate from 256 QAM to 16 QAM. This reduces throughput, which may not be a problem at a low traffic time, such as the middle of the night.

Figure 24:
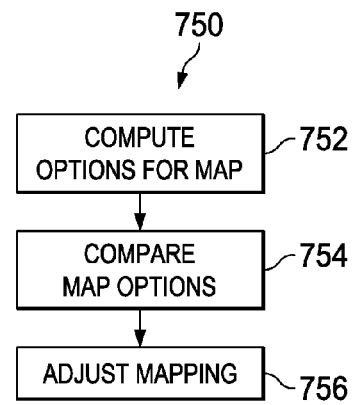
FIG. 24 illustrates another embodiment method of adjusting links in a C-RAN.

FIG. 24 illustrates flowchart 750 for a method for determining a change in mapping in a C-RAN. This method may, for example, be performed by computation block 316 to determine a change in mapping, which will be implemented by changing BBU-RRU connections using one or more photonic switch. Initially, in step 752, mapping options are computed.

Then, in step 754, the mapping options are compared to each other, and to the current mapping. The current mapping may be stored in memory. Decisions on how to change the BBU-RRU connectivity to achieve the traffic characteristics are performed, for example, in accordance with a set of BBU-RRU mapping rules and algorithms, which seek to minimize changes and disruptions. These algorithms and rules may have many rules or aspects, such as differences below a certain threshold should be ignored, moving BBUs from active to inactive is better or worse than moving BBU between activities, or to minimize the number of BBU moves. It is desirable to prevent cycling between the pool of active BBUs and the pool of inactive BBUs. It is also desirable to minimize the optical path length while supporting the traffic.

Finally, in step 756, the mapping is adjusted. The new mapping is stored, for example in memory. The new mapping may then be implemented by adjusting one or more photonic switch. BBUs, RRUs, and antennas may be activated and/or deactivated. Also, BBU-RRU links may be adjusted.

Figure 25:
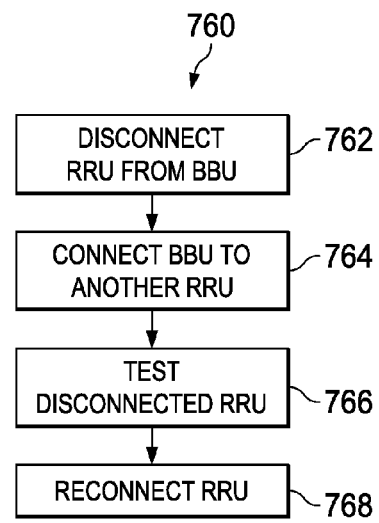
FIG. 25 illustrates an additional embodiment method of adjusting links in a C-RAN.

FIG. 25 illustrates flowchart 760 for a method of reconfiguring a C-RAN to test an RRU. Initially, in step 762, the RRU to be tested is disconnected from the BBU that it is linked to, for example using one or more photonic switch.

After the RRU is disconnected, the disconnected BBU may be reconnected to another RRU in step 764 to provide coverage. Step 764 may not be necessary, for example if the testing is being performed at a low traffic time.

Then, in step 766, the disconnected RRU is tested. The testing may determine whether the RRU is operating appropriately.

Finally, in step 768, the RRU may be reconnected, for example using one or more photonic switch. The RRU is not reconnected if a problem is found during testing. Also, the RRU may not be reconnected if it is not currently needed due to a low traffic load. In this case, the RRU is added to a bank of available RRUs.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A cloud radio access network (C-RAN) comprising:
   a first plurality of antennas;
   a first plurality of radio remote units (RRUs) coupled to the first plurality of antennas;
   a first plurality of broadband base units (BBUs);
   a first photonic switch optically coupled between the first plurality of RRUs and the first plurality of BBUs, wherein the first photonic switch is configured to link RRUs of the first plurality of RRUs to BBUs of the first plurality of BBUs, and wherein the first photonic switch is at a first location; and
   a plurality of photonic switches optically coupled between the first photonic switch and the first plurality of RRUs, wherein the plurality of photonic switches comprises a second photonic switch, wherein the second photonic switch is at a second location, wherein the first location is different than the second location, and wherein the first photonic switch and the plurality of photonic switches form a mesh network, a tree-and-branch network, or a duplicated tree-and-branch network.

2. The C-RAN of claim 1, wherein the first photonic switch is optically coupled to the first plurality of RRUs by a first plurality of optical fibers, and wherein the first photonic switch is optically coupled to the first plurality of BBUs by a second plurality of optical fibers.

3. The C-RAN of claim 1, wherein the first plurality of antennas comprises a first antenna and a second antenna, wherein the first plurality of RRUs comprises a first group of RRUs and a second group of RRUs, wherein the first group of RRUs is coupled to the first antenna, wherein the second group of RRUs is coupled to the second antenna, and wherein the first group of RRUs and the first antenna are located at a first site, and wherein the second group of RRUs and the second antenna are located at a second site.

4. The C-RAN of claim 1, wherein the first photonic switch is configured to adjust a plurality of links between the first plurality of RRUs and the first plurality of BBUs in accordance with time of day traffic capacity levels.

5. The C-RAN of claim 4, wherein the time of day traffic capacity levels are in accordance with historical statistics gathering.

6. The C-RAN of claim 1, wherein the first photonic switch is configured to adjust a plurality of links between the first plurality of RRUs and the first plurality of BBUs in accordance with a detection of a localized high level of traffic.

7. The C-RAN of claim 6, wherein the localized high level of traffic is not in accordance with historical statistics gathering.

8. The C-RAN of claim 1, wherein the first photonic switch is configured to adjust a plurality of links between the first plurality of RRUs and the first plurality of BBUs in accordance with a measured traffic flow in the plurality of links.

9. The C-RAN of claim 1, wherein the first photonic switch is configured to adjust a plurality of links between the first plurality of RRUs and the first plurality of BBUs in accordance with a detection of an equipment failure.

10. The C-RAN of claim 1, wherein the plurality of photonic switches further comprises
    a third photonic switch optically coupled to the first photonic switch and the second photonic switch,
    wherein the C-RAN further comprises a second plurality of RRUs optically coupled to the third photonic switch.

11. The C-RAN of claim 10, wherein the plurality of photonic switches further comprises
    a fourth photonic switch optically coupled to the second photonic switch and the third photonic switch,
    wherein the C-RAN further comprises a third plurality of RRUs optically coupled to the fourth photonic switch.

12. The C-RAN of claim 11, further comprising:
    a second plurality of BBUs,
    wherein the plurality of photonic switches further comprises a fifth photonic switch optically coupled between the second plurality of BBUs and the fourth photonic switch, wherein the first plurality of BBUs is located at a first site, and wherein the second plurality of BBUs is located at a second site.

13. The C-RAN of claim 1, further comprising:
   a wavelength division multiplexing (WDM) multiplexer optically coupled between the first photonic switch and the first plurality of RRUs; and
   a WDM demultiplexer optically coupled between the WDM multiplexer and a first RRU of the first plurality of RRUs.

14. The C-RAN of claim 1, wherein the first photonic switch is a transparent photonic switch configured to provide jitter free low latency links between the first plurality of RRUs and the first plurality of BBUs.

15. A method for adjusting links in a cloud radio access network (C-RAN), the method comprising:
   detecting a fault to produce a detected fault, wherein detecting the fault comprises receiving an alert;
   unlinking, by a photonic switch, a first radio remote unit (RRU) of a plurality of RRUs from a first broadband base unit (BBU) of a plurality of BBUs in accordance with the detected fault, wherein the photonic switch is optically coupled between the first RRU and the first BBU; and
   linking, by the photonic switch, a second RRU of the plurality of RRUs to the first BBU, wherein the photonic switch is optically coupled between the first BBU and the second RRU.

16. The method of claim 15, wherein the first RRU, the second RRU, and a first antenna are collocated.

17. The method of claim 15, wherein the first RRU and a first antenna are located at a first site, and wherein the second RRU and a second antenna are located at a second site, the method further comprising:
   powering down the first RRU; and
   expanding a coverage area of the second antenna.

18. The method of claim 15, further comprising powering down a second BBU of the plurality of BBUs, wherein the second BBU is optically coupled to the photonic switch.

19. The method of claim 15, further comprising testing the first RRU.

20. The method of claim 15, wherein detecting the fault comprises detecting an equipment outage.

21. The method of claim 15, wherein detecting the fault comprises detecting a failure in an optical link between the photonic switch and the first RRU.

22. A method for adjusting links in a cloud radio access network (C-RAN), the method comprising:
   deciding to adjust an old mapping between a plurality of BBUs and a plurality of RRUs to a new mapping only in accordance with a schedule, wherein a photonic switch is optically coupled between the plurality of RRUs and the plurality of BBUs;
   determining a new mapping between the plurality of BBUs and the plurality of RRUs; and
   adjusting a plurality of links between the plurality of BBUs and the plurality of RRUs in accordance with the new mapping.

23. The method of claim 22, wherein determining the new mapping comprising minimizing optical path lengths between the plurality of BBUs and the plurality of RRUs.

24. The method of claim 22, wherein determining the new mapping comprises minimizes differences between the old mapping and the new mapping.

25. The C-RAN of claim 1, wherein the first photonic switch is a micro-electro-mechanical system (MEMS) photonic switch.

26. The C-RAN of claim 1, wherein the first photonic switch is a multi-plane switch.

27. The C-RAN of claim 1, wherein the first photonic switch is a multi-stage switch.

28. The C-RAN of claim 1, further comprising a network edge switch electrically coupled to the first plurality of BBUs.

29. The C-RAN of claim 1, wherein the first photonic switch is configured to adjust a plurality of links between the first plurality of RRUs and the first plurality of BBUs in accordance with a received alert indicating a detected fault.

30. The C-RAN of claim 1, wherein the first photonic switch is configured to adjust a plurality of links between the first plurality of RRUs and the first plurality of BBUs only in accordance with a schedule.

* * * * *